(12) United States Patent
Macoretta et al.

(10) Patent No.: US 11,364,456 B2
(45) Date of Patent: Jun. 21, 2022

(54) CONTAINER ASSEMBLY

(71) Applicant: BRITA LP, Oakland, CA (US)

(72) Inventors: Federico Macoretta, Pleasanton, CA (US); Rick T. Nishijima, Pleasanton, CA (US); Madeline A. Donovan, Pleasanton, CA (US); Russell E. Bell, Pleasanton, CA (US); Piercy Yau, Causeway Bay (HK)

(73) Assignee: BRITA LP, Oakland, CA (US)

( * ) Notice: Subject to any disclaimer, the term of this patent is extended or adjusted under 35 U.S.C. 154(b) by 0 days.

(21) Appl. No.: 16/801,891

(22) Filed: Feb. 26, 2020

(65) Prior Publication Data

US 2020/0276527 A1 Sep. 3, 2020

Related U.S. Application Data

(60) Provisional application No. 62/812,704, filed on Mar. 1, 2019.

(51) Int. Cl.
| | |
|---|---|
| B01D 35/143 | (2006.01) |
| B01D 29/05 | (2006.01) |
| B01D 35/157 | (2006.01) |
| C02F 1/00 | (2006.01) |
| C02F 1/28 | (2006.01) |
| B67D 3/00 | (2006.01) |

(52) U.S. Cl.
CPC .......... *B01D 35/143* (2013.01); *B01D 29/05* (2013.01); *B01D 35/1573* (2013.01); *B67D 3/0061* (2013.01); *B67D 3/0093* (2013.01); *C02F 1/003* (2013.01); *C02F 1/008* (2013.01); *C02F 1/283* (2013.01); *B01D 2201/291* (2013.01); *B01D 2201/304* (2013.01); *C02F 2201/005* (2013.01); *C02F 2307/10* (2013.01)

(58) Field of Classification Search
CPC ........ B01D 2201/291; B01D 2201/304; B01D 29/05; B01D 35/143; B01D 35/1573; B01D 35/027; B67D 3/0061; B67D 3/0093; B67D 2210/00005; B67D 2210/0001; B67D 2210/00036; B67D 3/0003; B67D 3/0067; B67D 3/0077; B67D 3/04; B67D 3/043; C02F 1/003; C02F 1/008; C02F 1/283; C02F 2201/005; C02F 2307/10; C02F 2209/005; C02F 2209/445; C02F 2307/02; C02F 2307/04; C02F 1/002; A45F 2003/163
See application file for complete search history.

(56) References Cited

U.S. PATENT DOCUMENTS

| | | | |
|---|---|---|---|
| 3,392,837 A * | 7/1968 | Sanzenbacher | ......... C02F 1/003 210/282 |
| 4,181,243 A | 1/1980 | Frahm | |
| 4,491,520 A | 1/1985 | Jaye | |
| 4,986,901 A * | 1/1991 | Nohren, Jr. | .......... B01D 35/143 210/232 |

(Continued)

*Primary Examiner* — Terry K Cecil
(74) *Attorney, Agent, or Firm* — Edell, Shapiro & Finnan, LLC

(57) ABSTRACT

A container assembly is disclosed. The container assembly includes a container that contains a volume. Selected portions of the container assembly may be removable. A spigot assembly may be removed and associated with a filter assembly. An ambient light sensor may be included to determine when the filter assembly has been removed.

29 Claims, 17 Drawing Sheets

(56) References Cited

U.S. PATENT DOCUMENTS

| | | | |
|---|---|---|---|
| 6,569,329 B1 | 5/2003 | Nohren, Jr. | |
| 10,094,097 B2 * | 10/2018 | Mun | B65D 90/00 |
| 10,471,375 B1 | 11/2019 | Zerban et al. | |
| 10,906,819 B2 * | 2/2021 | Liao | C02F 1/325 |
| 2006/0163169 A1 * | 7/2006 | Eckhardt | C02F 1/008 |
| | | | 210/748.11 |
| 2006/0163455 A1 | 7/2006 | Lewin et al. | |
| 2007/0019433 A1 | 1/2007 | Lowles | |
| 2007/0228263 A1 | 10/2007 | Shen et al. | |
| 2010/0008675 A1 | 1/2010 | De Dobbelaere | |
| 2010/0051532 A1 | 3/2010 | Wawrla et al. | |
| 2011/0278207 A1 | 11/2011 | Swain | |
| 2015/0063821 A1 | 3/2015 | Mathews et al. | |
| 2015/0246824 A1 | 9/2015 | Boudreau et al. | |
| 2016/0096718 A1 | 4/2016 | Gallardo | |
| 2016/0220925 A1 | 8/2016 | Savoy et al. | |
| 2016/0249435 A1 | 8/2016 | Modi et al. | |
| 2016/0334076 A1 | 11/2016 | Dong et al. | |
| 2016/0353531 A1 | 12/2016 | Conner et al. | |
| 2017/0117859 A1 | 4/2017 | Aina et al. | |
| 2020/0079658 A1 * | 3/2020 | Weber | B01D 29/605 |

\* cited by examiner

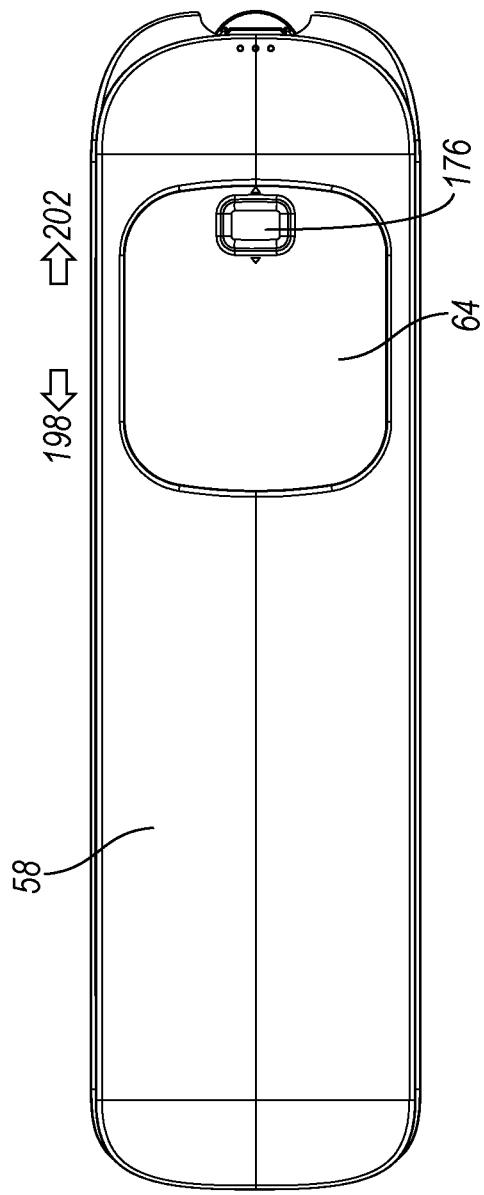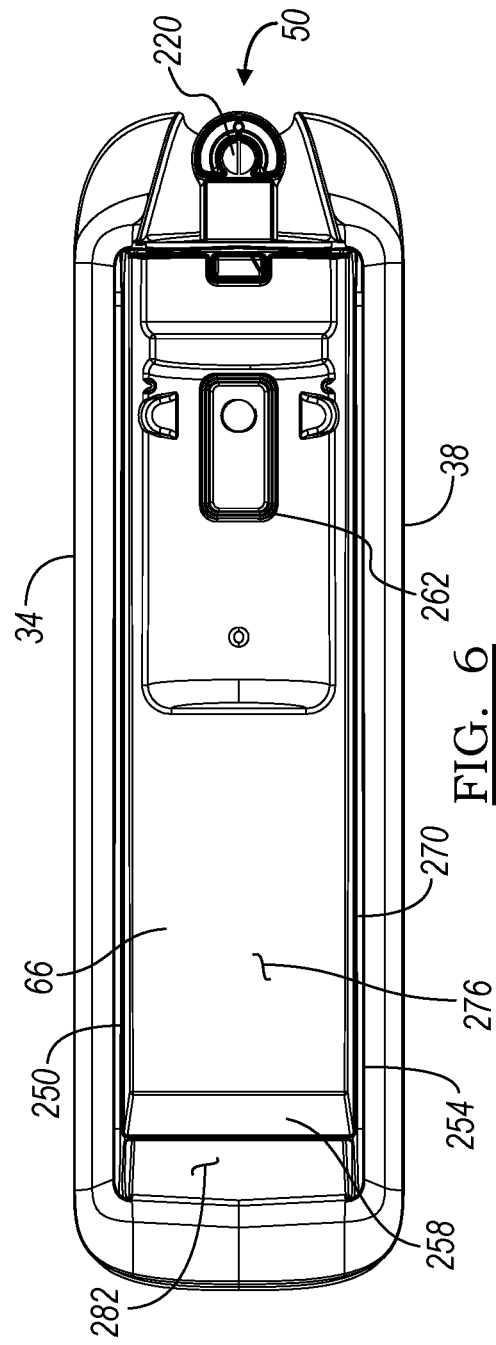

CONTAINER ASSEMBLY

CROSS-REFERENCE

This application claims the benefit of and priority to U.S. Provisional Application No. 62/812,704, filed on Mar. 1, 2019. The disclosure is herein incorporated by reference in its entirety.

FIELD

The subject disclosure relates to a container, and particularly to a container including a dispensing mechanism.

BACKGROUND

This section provides background information related to the present disclosure which is not necessarily prior art.

A container may hold a volume of a fluid, such as liquid water, for a selected period of time. The container, however, may generally need to be accessed to allow for a fluid to be removed from the container at a selected period of time. Generally, for example, a lid of the container must be removed to access an interior of the container to access the fluid contained therein.

SUMMARY

This section provides a general summary of the disclosure, and is not a comprehensive disclosure of its full scope or all of its features.

A container may be formed of a selected material, such as a food suitable polymer, metal, and/or glass. The container may include a plurality of walls, such as substantially orthogonally formed walls to form side walls and/or a base to define an interior volume. The walls may also be formed at generally non-orthogonally angles relative to one another. Additionally, the container may include removable features, such as a lid or filling cover, to allow for ease of access to fill the container. In various embodiments, the container may include a bottom or lower wall from which side walls extend. The bottom wall may be positioned on a surface and/or have legs or protrusions extending therefrom.

In various embodiments, the container may further include a dispensing system. The dispensing system may include one or more valve mechanisms that selectively allow removal or dispensing of fluid from the container. The valve system may extend through a side wall, or a selected wall portion of the container, to allow access to the interior of the container without opening the container. The valve mechanism may be operated by a user in a selected manner to retrieve or empty a selected volume from the container.

Additionally, a selected filter mechanism may be associated with the valve to selectively filter material exiting the container. The filter mechanism may be fixed to the valve mechanism in a selected manner.

The valve mechanism may be removed from the container at a selected time, or at a selected rate, to allow access to the filter mechanism. The filter mechanism may be connected to the valve mechanism or assembly and be removed as a single unit. In various embodiments, the filter mechanism may be connected to the valve mechanism to allow for ease of removal of the filter from the container. In various selected embodiments, the valve assembly may include an indication mechanism to indicate a timing for replacement and/or cleaning of the filter mechanism from within the container. The filter mechanism, therefore, may be used in an efficient manner for filtering of fluid from the container as it exits the container through the valve mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a top elevation view of the container assembly of FIG. 1;

FIG. 6 is a bottom elevation view of the container assembly of FIG. 1;

Corresponding reference numerals indicate corresponding parts throughout the several views of the drawings.

DETAILED DESCRIPTION

Figure 1:
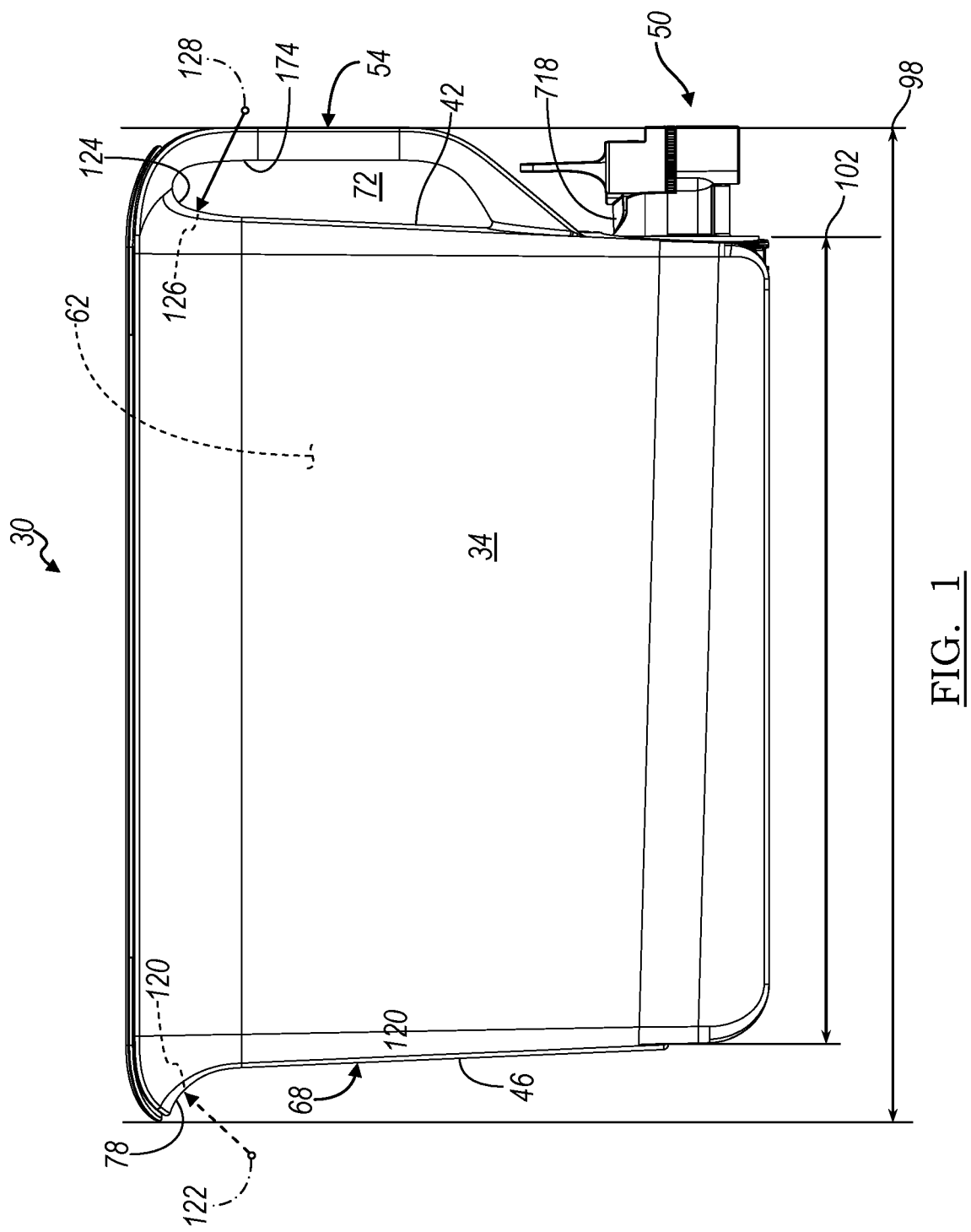
FIG. 1 is a first side elevation view of a container and valve assembly, according to various embodiments.
Figure 2:
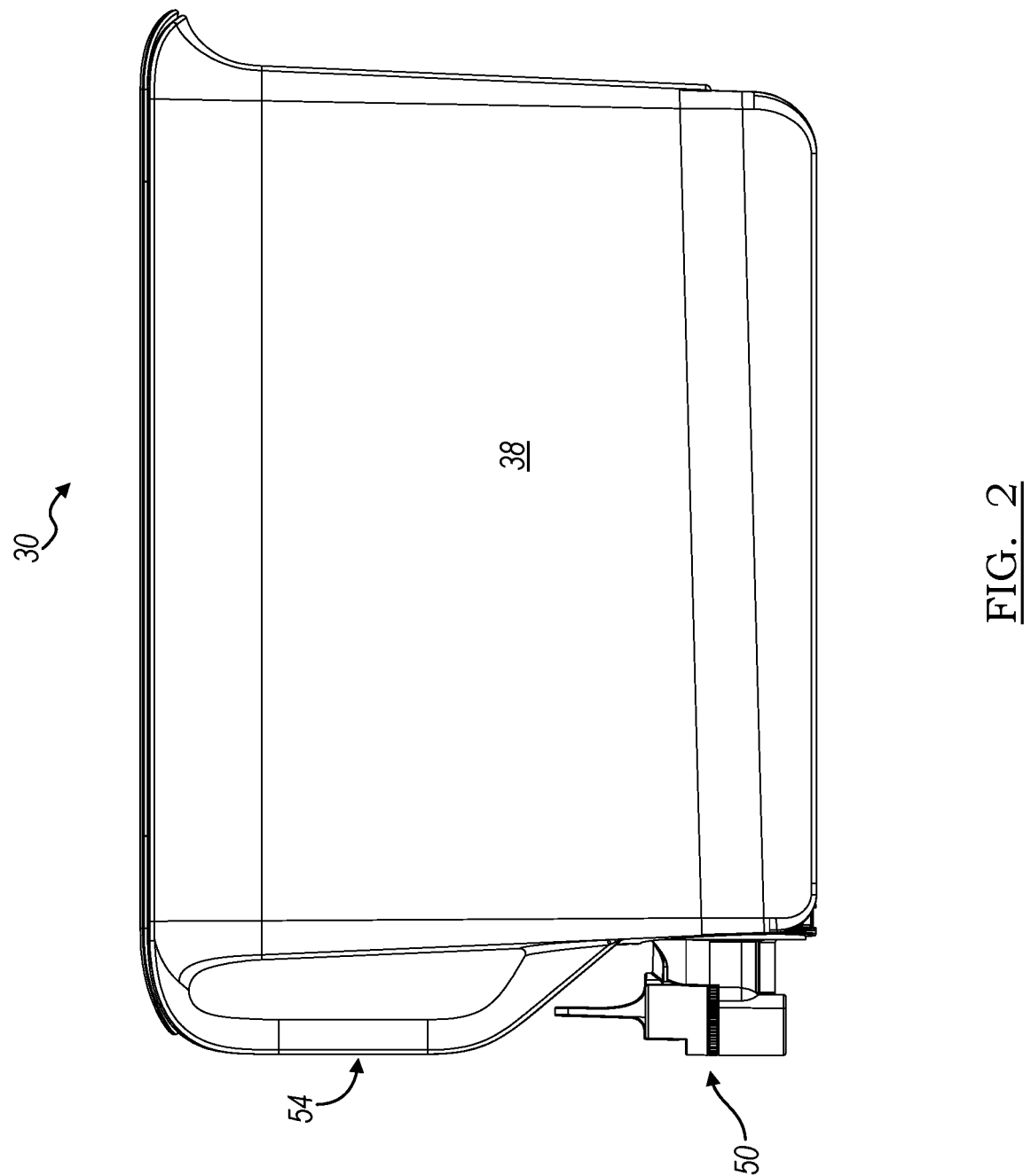
FIG. 2 is a second side elevation view of the container assembly of FIG. 1.

Example embodiments will now be described more fully with reference to the accompanying drawings.

With reference to FIGS. 1-11, a container assembly 30 is illustrated. The container assembly may be used for various purposes, such as containing and/or dispensing a fluid. The fluid may include water that is filled into the container assembly and then released therefrom. The water may be filled into the container unobstructed and unfiltered. The water may, then, be filtered on demand as it is dispensed form the container assembly 30. A filter assembly may be positioned at or in connection with a valve assembly for dispensing fluid from the container assembly 30.

The container assembly 30 includes a container including a plurality of walls, such as a first side wall 34, a second side wall 38, a first end wall 42, and a second end wall 46. Further, the container assembly 30 may include a spigot assembly 50 and a handle 54.

In the discussion herein, the several walls 34-46 may be individually or separately referred to as end or side walls, front and back walls, etc., and the reference herein is merely for reference of the current disclosure and not intended to limit the disclosure herein, unless specifically stated. Accordingly, the first side wall 34 may be referred to as a left side wall and the second side wall 38 may be referred to as a right side wall. Again, reference to right or left side walls is merely for clarity of the current discussion and not intended to limit or require any particular orientation.

The spigot assembly 50 may extend through the first end wall 42 and opposite or opposed to the second end wall 46. Thus, the first end wall 42 may also be referred to as a front wall and the second end wall 46 may be referred to as a back wall. Again, the orientation is merely for the current discussion, and not intended to require any particular orientation of the container assembly 30.

The container assembly 30 may include various removable or movable walls or portions, such as a top or lid 58. The lid 58 may be removable, as discussed further herein. The lid 58 may engage a selected portion of the container assembly 30 and cover a portion of an internal volume 62 defined by the container assembly 30, such as the walls 34-46. The container assembly 30 may further include an access panel 64 that may be movable relative to the lid 58. Further, the container assembly 30 may include a bottom wall or floor 66.

Accordingly, the container assembly 30 may include a container member or structure 68 that defines or contains the internal volume 62 by the various walls 34, 38, 42, 46, 66, and the upper lid wall 58. The internal volume 62 may be filled with a selected material, such as a fluid (e.g. water). The material within the internal volume 62 within the container 68 may be accessed through selected mechanisms, such as with the spigot or valve assembly 50, as discussed further herein. In various embodiments, fluid may be filtered as it is removed from the container 68 through the spigot assembly 50.

The internal volume 62 may be filled by removing or moving the lid 58 and/or moving or removing the access panel 64, as also discussed further herein. In this way, the container volume 62 may be filled without filter and without obstruction. The fluid may enter through the access panel 64 or the lid 58 without obstruction and fill the volume 62 without waiting and/or filtering. Accordingly, the container assembly 30 may be used to contain a selected material within the internal volume 62 and accessed at a selected time and/or rate, such as with the spigot assembly 50.

The container 68 may be formed of selected materials, such as substantially food safe materials. In various embodiments, the container 68 may be injection and/or bore molded from selected polymers, such as polystyrene. Other appropriate polymers may also be used to form the container 68 and/or lid 58. Additionally, various non-polymer materials may also be used such as glass, metal or metal alloys, or other appropriate materials. Thus, the container 68 may be formed of selected materials to allow for containing a fluid in a substantially water or leak tight manner.

Further the container 68, such as formed by the various walls 34-66, may include mechanisms to allow for easy filling and/or transport, such as to assist in the ease of filling and/or transport. For example, the handle assembly 54 may form or define a void 72 between a first surface 74 of the handle 54 and the wall 42. A user may extend one or more digits through the void 72 and grasp the handle 54 and/or the wall 42 to assist in moving the container assembly 30. Additionally, the rear or end wall 46 may define a projection or curved ledge 78 that extends from the rear wall 46 a selected distance. Accordingly, a user may engage the curved wall or ledge 78 with one or more digits of a hand or a portion of a hand to assist in moving the container assembly 30. Thus, the container assembly 30 may be easily grasped and moved by a user, such as using two hands, for transport from a selected location to a second location. Transportation may be from a filling station to a storage area or reverse.

In various embodiments the container 68 may include dimensions such as a height 80. The height 80 may be about 200 millimeters (mm) to about 300 mm, and further including about 280 mm. Further the container 68 may include a selected width that may taper from an upper or top width dimension 84 to a bottom or lower width 88. The upper width dimension 84 may be about 90 mm to about 150 mm, including about 110 mm. Further, the bottom or lower width dimension 88 may be about 70 mm to about 95 mm, and further including about 80. The taper may be any appropriate amount, such that the outer walls, such as the first side wall 34 may extend at an angle 92 relative to a central perpendicular axis 94 (e.g. an axis normal to a flat surface below the container 68 and/or floor 66). The angle 92 may be about 0.5 degrees to about 5 degrees, including about 2.5 degrees. Further, the container 68 may include a depth dimension 98 that may be a maximum dimension of the container assembly 30. The container 68 may also include a depth dimension 102 that may be a dimension of a lower portion of the container 68. Accordingly, in various embodiments, the container assembly depth dimension 98 may be a maximum depth dimension of the container assembly 30 and the container depth dimension 102 may be a depth dimension of the container portion alone. The maximum depth dimension 98 may be about 500 mm to about 300 mm, including about 400 mm. The container depth dimension 102 may be about 200 mm to about 500 mm, and further including about 300 cm.

In various embodiments, therefore, the container assembly 30 may be formed of a selected dimension or a plurality of dimensions for various portions of the container assembly 30. For example, the container assembly 30 may be dimensioned to be positioned within a refrigerator, such as on a refrigerator shelf, to maximize outer dimensions of the container assembly 30 and/or maximize shelf space while maximizing the container volume 62 within the container 68. For example, the depth dimension 98 may be a standard depth dimension of a refrigerator and the height dimension 80 may be a general or average height dimension between two shelves in a refrigerator to maximize the internal volume 62 while minimizing the width dimension 84, 88 of the container assembly 30.

Figure 4:
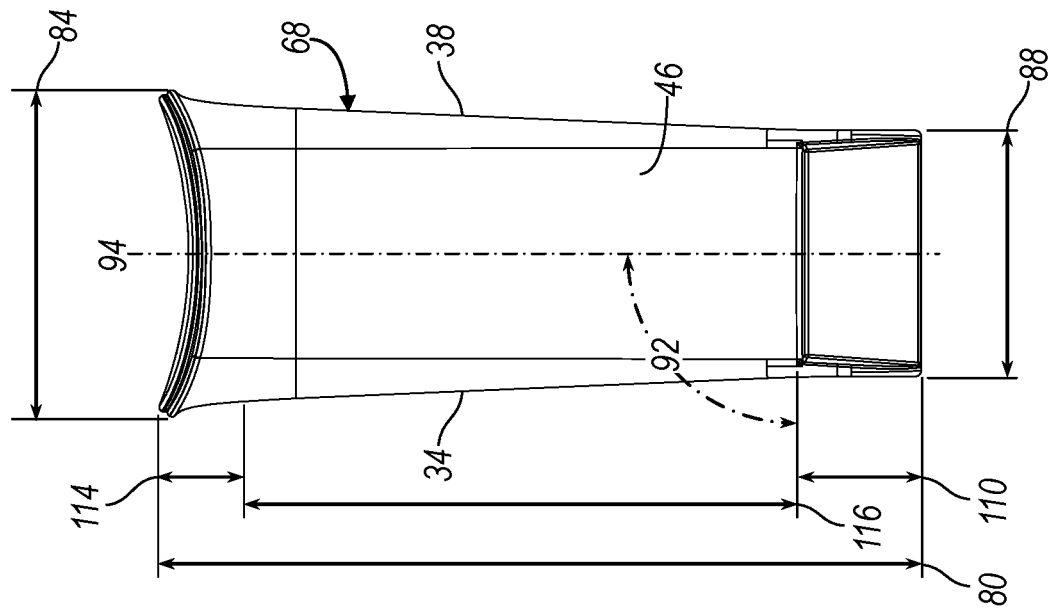
FIG. 4 is a second end elevation view of the container assembly of FIG. 1.
Figure 3:
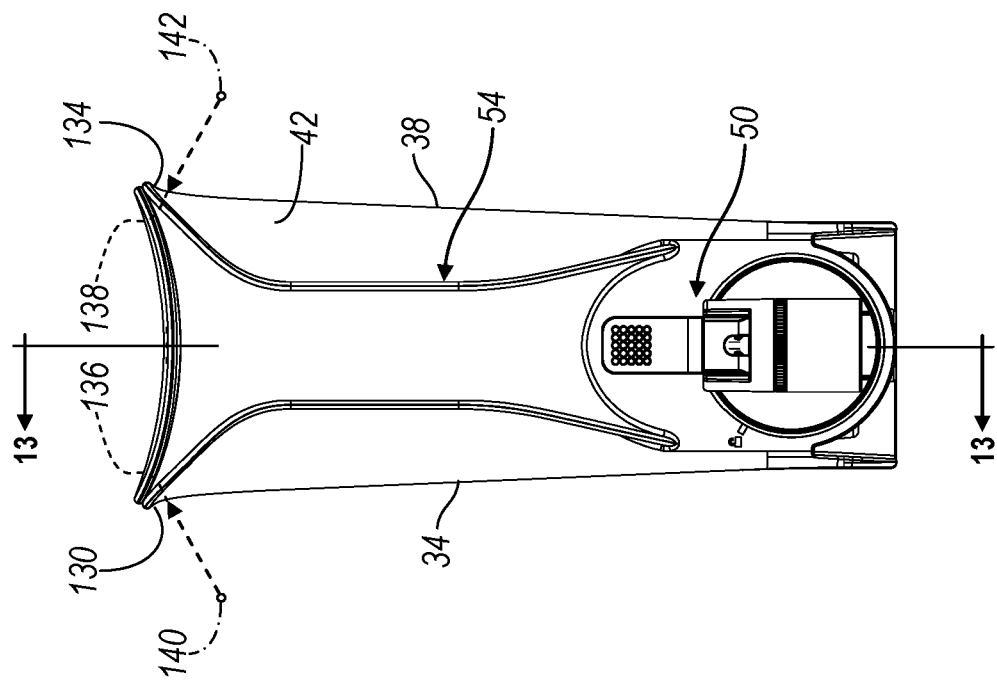
FIG. 3 is a first end elevation view of the container and valve assembly of FIG. 1.

As discussed above, the side walls 34, 38 may angle away from the central axis 94, as illustrated in FIG. 4 and FIG. 3. The angle 92 may be any appropriate angle, and may be selected to assist in maintaining structural integrity of the container 68 during containment of a volume of liquid or fluid within the internal volume 62. For example, when the container 68 is full or has a selected fluid therein, pressure may be exerted on the walls 34, 38. The selected angle may assist in determining or providing a selected rigidity to the container 68 when a selected volume is therein. The dimensions of the container 68 may also assist in stability.

Further, the container 68 may have selected regions, such as a foot or stand region 110, a top portion or region 114, and a mid- or containment region 116. The regions 110, 114, 116 may be any appropriate dimensions, including those discussed herein, and are provided for illustration and discussion of various portions of the container 68. It is understood, therefore, that the specific dimensions may be selected based upon a final or total volume or dimension of the container 68.

In various embodiments, as noted above, the rear portion of the container 68 may include an upper or curved region 78. The curved region or portion may be formed in the upper region 114 of the container. The curved portion 78 may have a selected radius 120 measured from a center 122 of an arc or circle. The radius 120 may be selected for various purposes, such as assisting in maintaining a selected structural integrity of the container 68 and/or engaging a hand or portion of the user. Further, the front wall 42, such as near the handle 54, may include a curved region or engagement portion 124 and may also have a selected radius 126 that extends from a center 128 of an arc or circle. Again the radius 126 may be selected for various purposes, such as assisting in engaging a handle of a user and for carrying and/or mobility of the container 68. Accordingly, the front wall 42 and/or the rear wall 46 may define selected engagement portions, such as the curved regions 78, 124, to assist in moving and/or for structural rigidity of the container 68.

The side walls 34, 38 may also form upper curved or angled regions, such as a first curve 130 and a second curve 134. The respective curves 130, 134 may also have radiuses 136, 138, respectively. Again, the radiuses 136, 138 may extend from arc or circle centers 140, 142, respectively. Accordingly, in the upper region 114 of the container 68 various curved portions may be formed of the container 68 to assist in providing a selected rigidity and/or mobility of the container 68. Thus, the container assembly 30 may be easily moved by a user, such as a single user, even when filled with the selected fluid, such as water. The curved and angled portions, as noted above, may assist in increasing a grip or resist slipping when help in hands of a user. In addition, the dimensions and curves may assist in providing an aesthetic acceptable to users. The dimensions may further enhance storage space adjacent to the container assembly 30.

The lid 58, as noted above, may be selectively disengaged from the container 68, such as from within the upper region 114. With reference to FIG. 5, FIG. 8, FIG. 9, and FIG. 11, the lid 58 is shown in exploded view from the container 68. The lid 58 may include one or more projections or detents 150 that may engage one or more indents 154 of the container 68. The indents 154 may extend into or from a surface 156 of an interior portion of the side walls 34, 38. The detents 150 may extend from a ridge or a wall 160 that extends from a bottom surface 164 of the lid 58. The detents 150 may engage the indents 154 to hold or lock the lid 58 to the container 68.

An internal wall or projection 164 may extend from an upper surface near the upper region 114 of the container 68. The wall 164 may extend around or contact the wall 160 of the lid 58, when the lid 58 is placed on the container 68. The inner wall 164 may include one or more alignment or holding regions, such as a projection or raised ridge 168 which may engage or be received in a recess 170 of the wall 160 extending from the lid 58. Accordingly, the lid 58 may be engaged to the container 68 in a substantially locked or held manner.

It is understood that other engagement features may also be added and/or as an alternative to the detents 150 and the indents 154. For example a continuous ridge may extend from the wall 160 to be engaged in a continuous furrow or depression formed within the container 68. Further, additional mechanical latches may provide for a secure connection and/or selectively lockable connection between the lid 58 and the container 68. Also, the wall 160 may include a high friction material to engage the internal surface 156 of the container 68.

Figure 11:
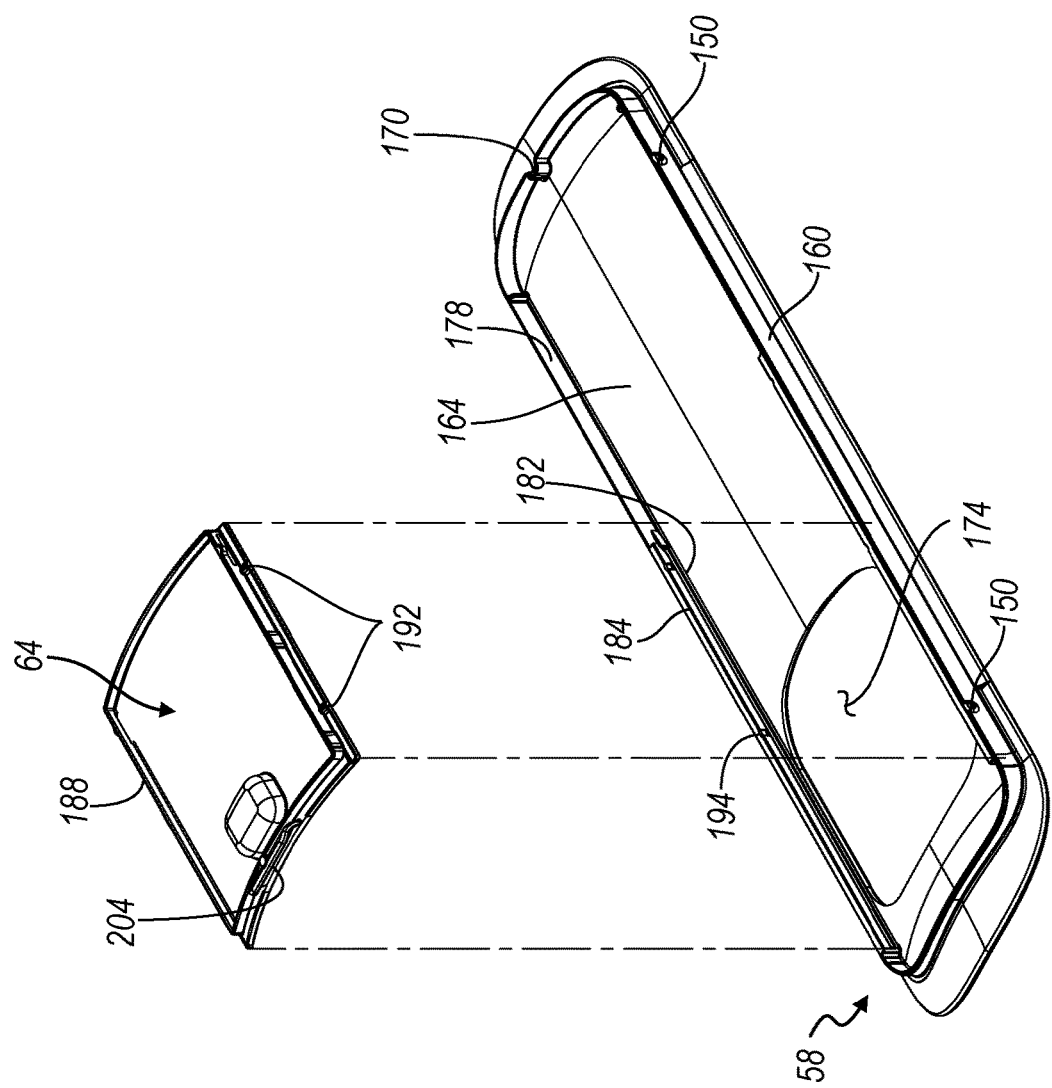
FIG. 11 is an exploded view of a lid assembly, according to various embodiments.
Figure 14:
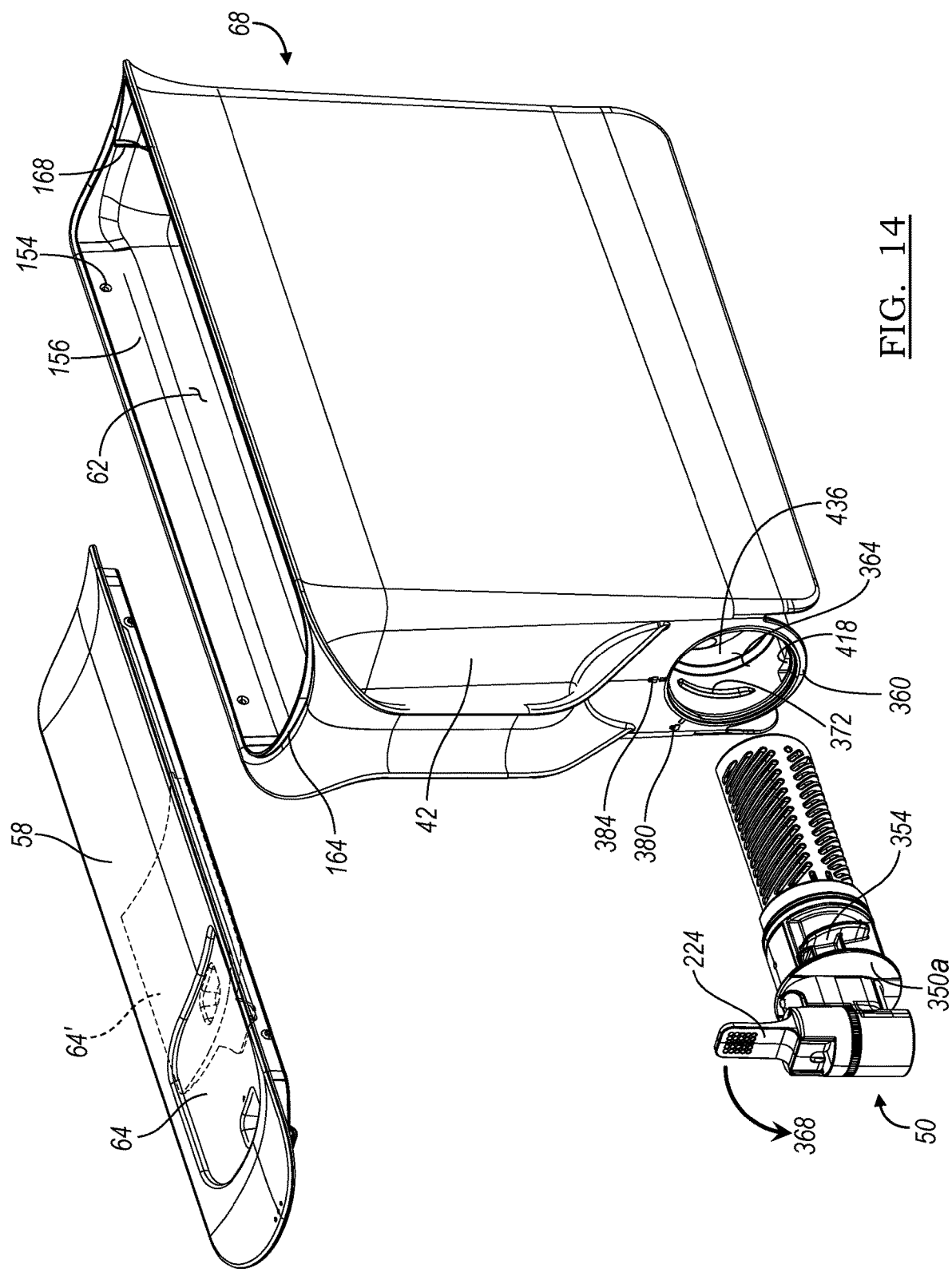
FIG. 14 is an exploded view of the container assembly of FIG. 1.

With reference to FIG. 11 and FIG. 14, the lid 58 may define an access portal or fill portal 174 through the surface 164. The access portal 174 may be selectively opened and closed by the access panel 64. The access panel 64 may include a holding or engagement portion, such as a depression or well 176. The handle portion 176 may allow for movement of the access panel 64 relative to the lid 58. For example, the wall 160 may have an internal surface 178 that defines a track or depression 182 between a rail 184 and the surface 164. The access panel 64 may have an engagement or rail portion, such as defined by an edge 188, which may be received within the track 182. The access panel 64 may further include one or more projections that may engage one or more indents 184 on the rail 184. The projection 192 may engage the indent 194 to assist in holding the access panel 64 in a selected position relative to the portal 174.

A user may move the access panel 64 a selected amount and have it positively engage and/or be held relative to the lid 58 at a selected time. For example, the user may slide the access panel 64 to open the access port 174, as illustrated in phantom 64' in FIG. 14. The access portal 174, therefore, may be the only opening needed to fill the container volume 62.

In various embodiments, the user may engage the handle or engagement portion 176 and slide the access panel 64 toward the rear wall 46, such as generally in the direction of arrow 198. At a selected point or position, the access panel 64 may engage the rail 184 by the projection 192 engaging the indent 194. The access panel 64 may then be held in the selected open position such that a material may be placed into the container volume 62 though the portal 174. At a selected time, the user may then move the access panel 64 toward the front wall 42, such as generally in the direction of arrow 202 to close the access port 174. Thus, the access port 174 may be opened and closed for filling the container volume 62.

The access panel 64 may further have an indication projection or wall 204 that may assist in the visual indication of a full or max volume or max fill level of the container volume 62. Accordingly, the user may fill the container 68 without removing the entire lid 58 from the container 68. Rather, the user may simply slide or move the access panel 64 to a selected position to allow filling of the container volume 62 though the portal 174.

The container assembly 30 includes the spigot assembly 50 as illustrated in FIGS. 1 and 3. The spigot assembly 50 extends from the front wall 42 of the container 68. The spigot assembly 50 further, however, includes portions that extend internally or toward the rear wall 46 of the container 68. In various embodiments, with reference to FIG. 7 and FIG. 10, the spigot assembly 50 may include an external exit port 220 and a handle 224. The spigot assembly 50 may further include an internal or engagement portion or region 226 that may assist in holding the spigot assembly 50 relative to the container 68. Further, the spigot assembly 50 may engage a filter assembly 230, as discussed further herein.

Figure 7:
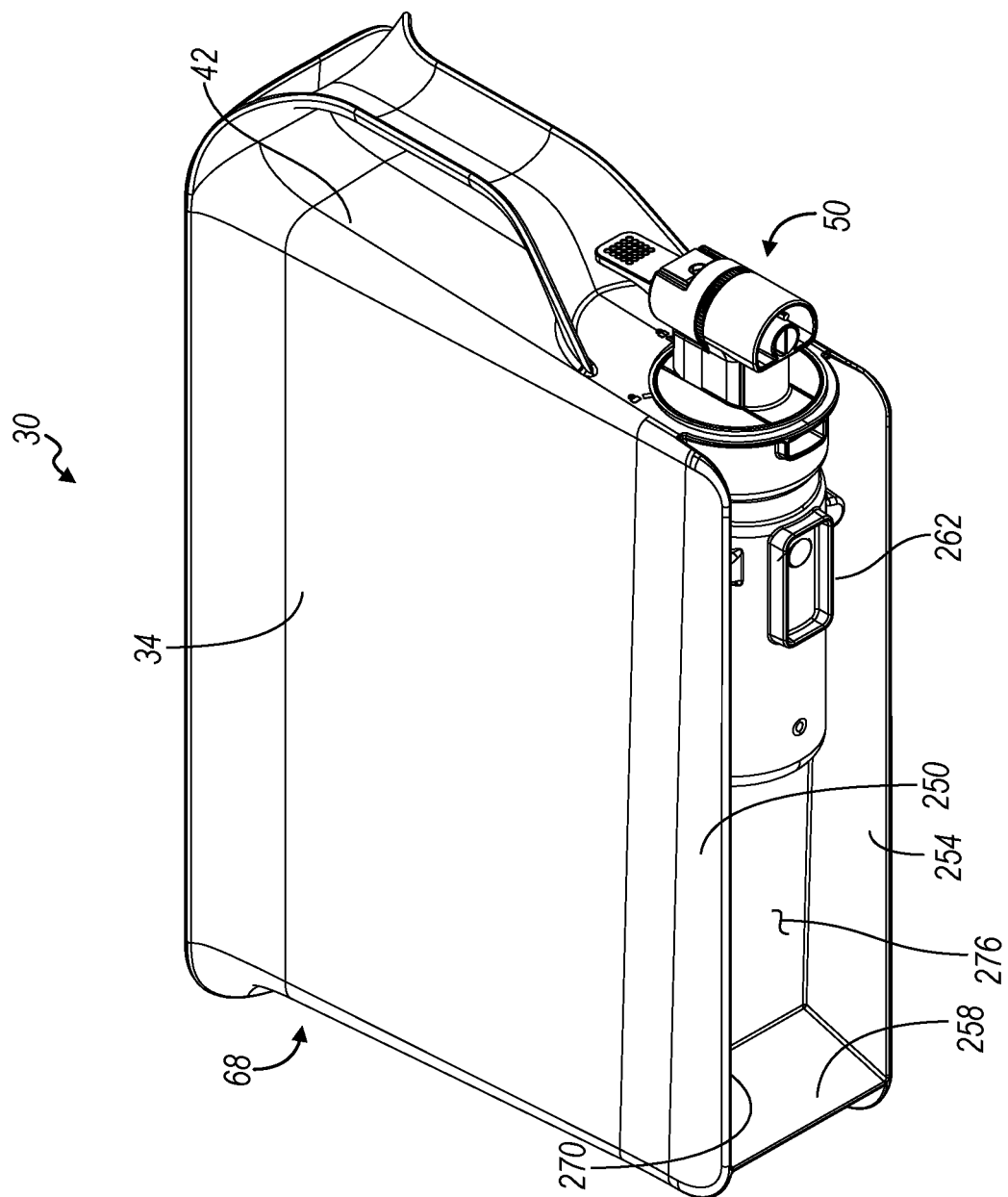
FIG. 7 is a bottom perspective view of the container assembly of FIG. 1.
Figure 8:
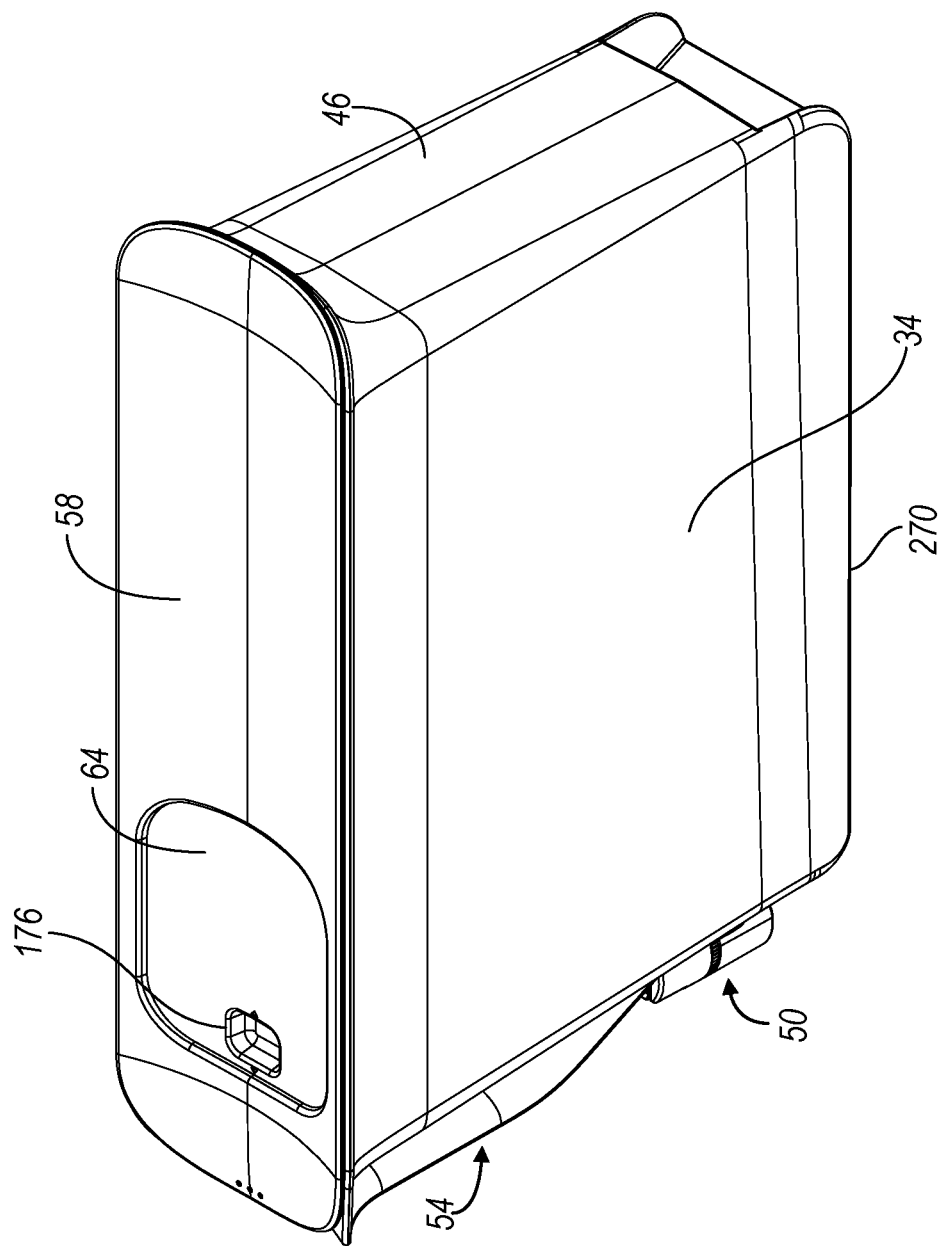
FIG. 8 is a first top perspective view of the container assembly of FIG. 1.
Figure 9:
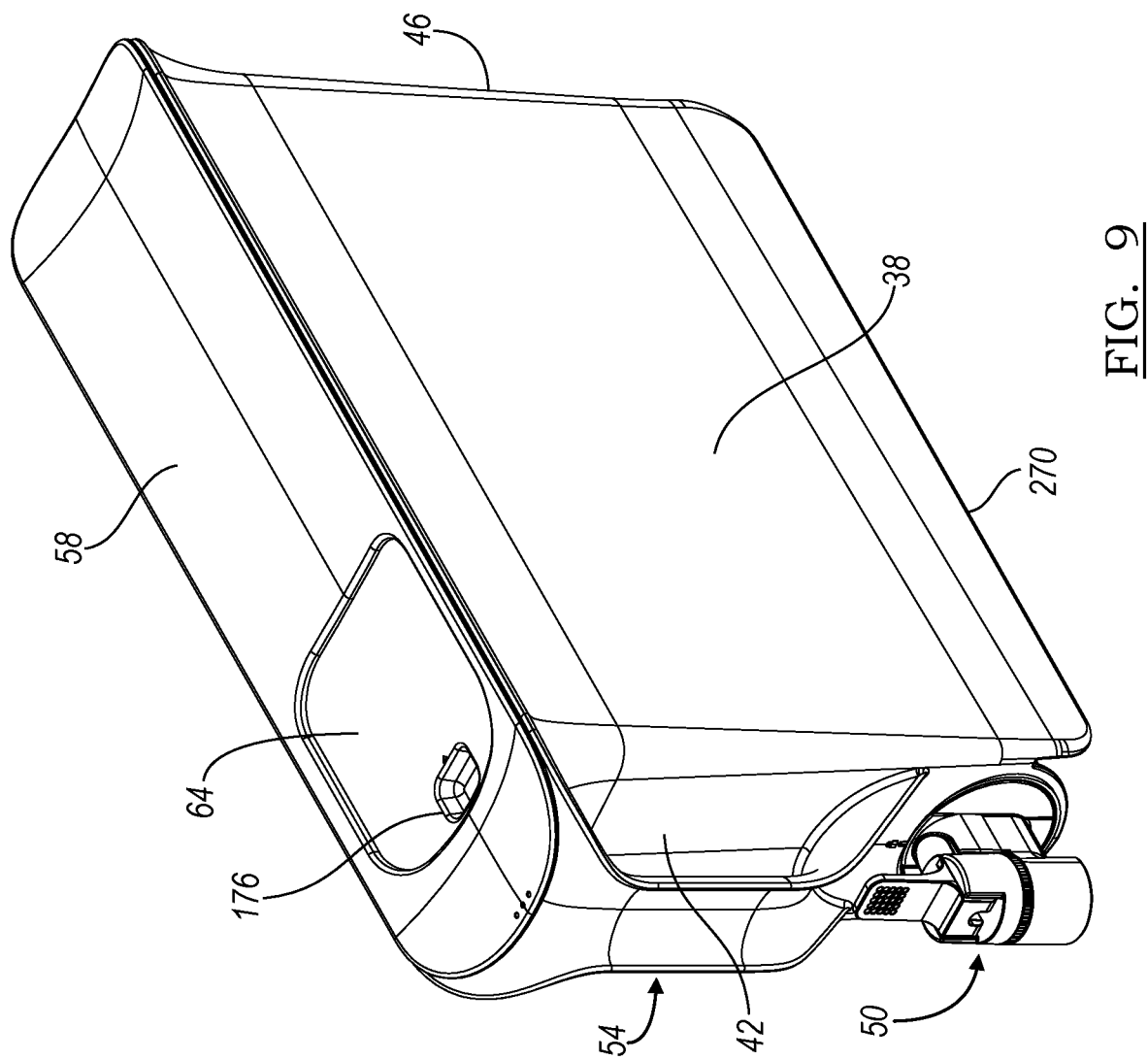
FIG. 9 is a second top perspective view of the container assembly of FIG. 1.
Figure 10:
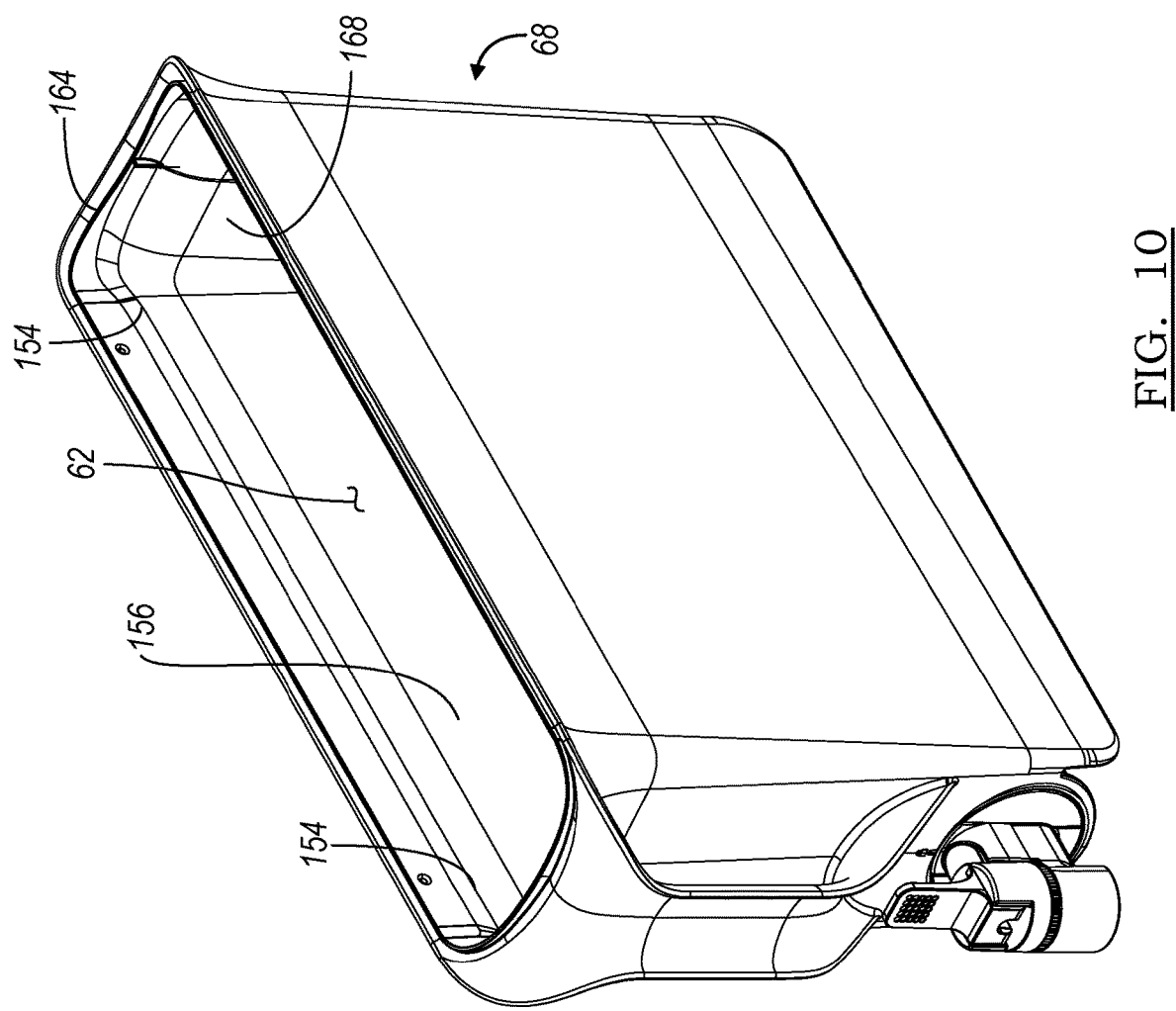
FIG. 10 is a top perspective view of the container assembly of FIG. 1 with a lid removed.

With continuing reference to FIG. 10 and additional reference to FIGS. 6 and 7, the container assembly 30 further includes the bottom wall or floor 66 that may include a first region 244 that is generally near the spigot assembly 50 and a second region 248 that extends rearward or away from the spigot assembly 50 toward the rear wall 46. The floor 66 may extend between the side walls 34, 38. Further legs or bottom portions, such as at the bottom portion 110 of the container 68, may extend past the floor 66 and encompass or enclose the portion of the spigot assembly 50 that extends within the container 68. For example, the first side wall 34 may include and/or have extending therefrom a first leg 250 and the second side wall 38 may include and/or have extending therefrom a second leg 254. The two legs 250, 254 may have dimensions that allow for at least a portion of the container 68 to extend from the first portion 248 away from the top region 114 of the container 68. Accordingly, the floor 66 may be held above a surface on which the container 68 rests. Further, a rear leg or connector 258 may extend between the two elongated legs 250, 254. Accordingly, the floor 66 of the container 68 may not contact a surface on which the container 68 rests. Additional support may extend from the floor 66, such as forward supports or wall 262 to assist in holding the container 68 from a support surface.

The floor 66 may extend at an angle or be positioned at an angle 268 relative to a bottom surface or contacting surface 270 of the legs 250, 254. The angle may be about 0.5 degrees to about 8 degrees, including about 1.5 degrees about a flat or level surface (e.g. 0 degrees). The angle 268 may cause, direct, and/or urge a fluid to generally be positioned near the spigot assembly 50 near the front wall 42 of the container 68. Accordingly, a fluid, such as a liquid including water, may be urged or directed toward the spigot 50 when the container 68 is positioned on a substantially flat surface. Thus, the container 68 may substantially emptied during use thereof. In other words, the container 68 may be substantially emptied or fluid through the spigot assembly 50 without tilting the moving the container assembly 30 from a flat surface.

Further, the first region 244 of the floor 66 may allow for enclosing or encapsulation of the spigot assembly 50, including the filter assembly 230 connected to the spigot assembly internal portion 226. The first region 244 may also be referred to as a sump. Thus, the floor 66 may include only a small or only a portion thereof that is the lowest portion or a sump. Further, the second portion 246 may be angled toward or to the first portion 244. Thus, the fluid in the container may be maximized that is emptied or dispensed through the spigot assembly 50 without tilting the container 68.

As discussed above, the container 68 may include various features to assist in portability of the container 68. For example, the handle 54 may be engaged by the user to hold or move the container 68. Further, the radius or curved regions 78, 124 may assist in holding the container 68. In addition, as noted above, the floor 66 may extend from the rear wall 46 toward the front wall 42. The legs 250, 254 may extend below the wall floor 66 and create a depression or void 276. The void 276 may assist the user in grasping around the legs 250, 254 to assist in moving or holding the container 68. Further, the rear leg 258 may extend or be positioned at an angle relative to the rear wall 46 and a rear portion 278 of the floor 66. Accordingly, the rear leg 258 and the rear portion 278 of the floor 66 may define a second void or area 282 that may also act as a hand hold or gripping region to engage the container 68. Thus, the container 68 may be grasped at the upper sides and/or front and rear portions, and further at bottom portions near the floor 66.

With continuing reference to FIG. 10, and additional reference to FIG. 11, FIG. 12, FIG. 13, and FIG. 14, the spigot assembly 50 will be described in greater detail. As noted above, the spigot assembly 50 includes the exit port 220 and handle 224, which may form part of a valve assembly 300. Connected to the valve assembly 300 is the filter assembly 230 via the internal or interconnection portion 226 of the valve assembly 300.

Figure 13:
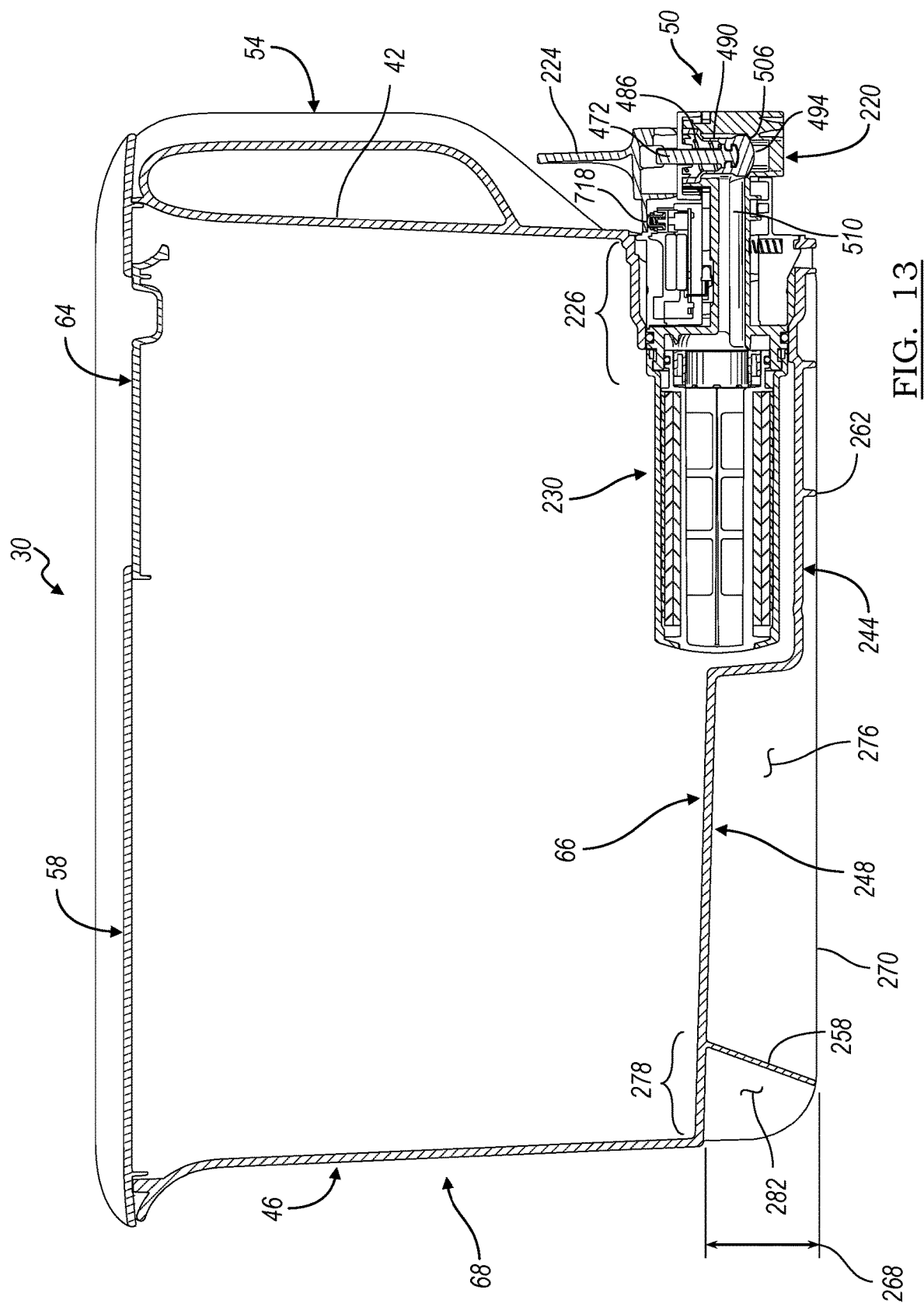
FIG. 13 is a cross-sectional view of the container assembly of FIG. 1 taken along line 13-13 of FIG. 3.

With initial reference to FIG. 13, the filter assembly 230 may include a filter member portion 301 that may be substantially replaceable including an internal core portion 310 around which a filter member or media 314 is wrapped or positioned. In various embodiments, the filter media 314 may be wrapped in one or two wraps around the core 310. The core 310 may be substantially open at a first end 316 and selectively open or closed at a second end 318. The filter media 314 may be fixed to the core portion 310 in a selected manner, such as with an adhesive, welding, or the like. The filter assembly 230 may further include a cap or engagement member 322 to cap or cover the core portion 316. An O-ring 312 or other appropriate sealing member may also engage the core 310 to assist in sealing and/or holding the filter portion.

The filtering assembly or filter member portion 301, including the core 310, a filter media 310, and the cap 322, may be interconnected with an outer cage or filter holding portion 326. The cage 326 may include an outer portion 328 that includes a plurality of bores, slots, or thoughbores 330 such that a fluid may pass through the bores 330, the filter media 314, the core 310, and the cap 322 to exit the valve portion 300.

The filter assembly portion 230 and/or filter member portion 301 may be any appropriate filter assembly portion, such as that disclosed in U.S. Pat. Pub. No. 2015/0166364, published Jun. 18, 2015; U.S. Pat. Pub. No. 2016/0376165, published Dec. 29, 2016; U.S. Pat. Pub. No. 2018/0319672, published Nov. 8, 2018; U.S. Pat. Pub. No. 2018/0250615, published Sep. 6, 2018; and U.S. Pat. Pub. No. 2018/0264382, published Sep. 20, 2018; each incorporated herein by reference. Filter member portion 301 may also include the Stream® filters sold by Brita LP having a place of business at California, USA. Accordingly, the filter assembly 230 may be connected to the valve assembly 300, such as with the cage portion 326 having a valve connection end or portion 340. In various embodiments, the filter medium 310 may include an activated carbon. The activated carbon may be a felt or other appropriate textile. Further, the activated carbon may be placed between a selected textile, such as a hydrophilic (e.g. cellulose) fabric.

In various embodiments, the container volume may hold about 25 fluid cups. In various embodiments, the container volume 62 may be about four liters (L) to about 7 L, including about 6 L. The filter portion 301 may allow a selected flow rate through the filter assembly 230, when the valve assembly is opened, as discussed herein. The flow rate may be about 0.25 gallons per minute to about two gallons per minute, including about 0.5 gallons per minute to about 0.9 gallons per minute, and further including about 0.75 gallons per minute to about 0.69 gallons per minute. The flow rate may be used to determine a total volume flow, in various embodiments, as discussed herein.

The valve connection portion 340 may include a selected connection, such as or including a quarter turn connection or a bayonet connection portion 344 that may engage a complementary bayonet connection or quarter turn connection portion 348 formed on a wall or extension portion 352 of the valve assembly 330. It is understood that the connection portion 344, 348, may include a plurality of connection portions such that more than one interconnection between the cage 326 and the valve assembly 300 is made. It is understood, however, that any appropriate number of connections may be made and one or two or four is merely exemplary.

The spigot assembly 50 may include the valve assembly portion 300, as illustrated in FIG. 14. The valve assembly 300 may include the internal or engagement portion 226 that engages the container 68. As illustrated in FIGS. 10 and 11, above, the container engagement section 226 may include an outer wall or front wall portion 350 and a second or engagement wall 354. It is understood that the front wall 350 may include a unitary or split portion, including a left and right portion, such as a front wall 350a and a front wall 350b. The two front walls 350 may engage in a front or portion of the wall 42 of the container at a spigot engagement section or region 360. The spigot engagement wall 360 may form or define a portal or passage 364 through the front wall 42 into the internal volume 62 of the container 68.

The rear or engagement walls 354 may be formed at a selected angle or position such that the spigot assembly 50 may be positioned into the portal 364 in a first orientation and rotated a selected amount, such as generally in the direction of 368, to lock or fix the spigot assembly 50 to the container 68. It is understood that the spigot assembly 50 may be selectively fixed or connected to the container 68, such as by rotating the spigot assembly in the direction of arrow 368 to lock the spigot assembly 50 to the container 68. The locking or engagement walls 354 of the spigot assembly 50 may engage internal locking walls 372 of the container 68. The internal locking wall 372 may extend radially from an internal wall 436 that extends internally from the front wall 42. The internal wall may further support at least a portion of the spigot assembly 50.

The spigot assembly 50 may be passed through the portal 364 in a first orientation and then rotated in the direction of arrow 368 to have the engaging walls 354 of the spigot assembly 50 engage the internal engagement walls 372. The engagement walls 354 may be formed in an angle 376 relative to a long axis 378 of the spigot assembly 50. Thus, by rotating the spigot assembly 50 the engagement walls 354 may apply a force to the internal engagement walls 372.

Accordingly, rotating the spigot assembly 50 in a direction opposite the arrow 368 may disengage the engagement walls 354 from the internal engagement walls 372. Markings or indicia on the front wall 42 may indicate a positioning of the spigot assembly 50 for engagement or disengagement from the container 68. For example, an "unlocked" marking or indication 380 may indicate an insertion or unlocked position of the spigot assembly 50. A "locked" marking 384 may show a locked or fixed position of the spigot assembly 50. The position of the handle 224 may be used as an indicator relative to the indications 380, 384 on the container 68.

A secondary or latch member 390 may be moveably held relative to the engagement portion 226 of the valve assembly 300 including a valve body or holding portion 394. The valve body 394 may define a portion, such as a groove or depression 396 defined or formed by at least a first side wall 398. The latch member 390 may be held relative to the groove 396 with a latch or holding finger 402 that engages or is held in a groove or depression 406 formed in the wall 398.

The latch member 390, however, may move relative to the body 394, such as generally in the direction of the double headed arrow 410, in a hinged manner. The latch member 390 may move due to a volume or space defined by the groove 406 that engages the finger 402. The latch member 390 may be biased in a selected direction, such as away from the body member 394, with a biasing member such as a coil spring 414, or other appropriate portion. The biasing spring 414 may bias the catch 390 away from the body member 394 to allow it to catch or engage the container 68.

The latch member 394 may include a projection or portion 416 that may be selectively received in a groove or depression 418 formed within an internal wall that defines the portal 364. Accordingly, the latch member 390 may engage the depression 418 in the container 68 to assist in holding or latching the spigot assembly 50 relative to the container 68. At a selected time, the user may disengage the latch member 390 from the container 68 by depressing the latch member 390 toward the body 394 by pushing on a portion of the latch member 390, such as a finger engagement or engaging portion or region 420. The finger engaging or engaging portion 420 may be positioned near the front wall 42, such as the engaging wall 360, and behind or between the wall and the exit port 220. The user may push the finger engaging portion 420 toward the handle 224, generally in the direction of arrow 424, to move the engagement or projection member 416 also in the general direction of arrow 424.

When depressed, the spigot assembly 50, therefore, may be disengaged with the engagement wall 354 and/or the latch member 390 to the container 68. When released, the latch member 390 may engage the container 68 and the spigot assembly 50 may be engaged to the container 68 in a substantially positive and/or locking manner to hold the spigot assembly 50 to the container 68. The latch assembly, including the latch member 390, may resist rotational motion of the spigot assembly 50 relative to the container 68 and/or axial movement, such as generally along the axis 378. As the engagement walls 354 axially hold the spigot assembly 50 within the container 68, such as during operation of the valve assembly, such as with the handle 224 and resisting rotation assists in maintaining the engagement within the container 68. Further the engagement walls 354 may hold the spigot assembly 50 to the container 68 such as under a pressure from a volume of fluid within a container 68.

The spigot assembly 50 may further include various sealing or locking portions, such as a sealing assembly including an O-ring or sealing member 430 that may be held or engaged within a sealing groove 434 formed on the engagement portion 226. The O-ring 430 may engage the inner wall portion or area 436 to assist in forming a fluid tight, such as water tight, seal between the spigot assembly 50 and the container wall 436 to substantially fluid or liquid seal the container 68. The valve assembly 300, however, may selectively allow for a fluid to exit though the outlet 220 through operation of a valve assembly, as discussed further herein, with the handle 224.

In various embodiments, therefore, the spigot assembly 50 may be removed from the container 68 as a single unit or portion. The valve assembly 300 connected to the filter assembly may be removed, as noted above. Thus, the filter assembly, or a portion thereof such as the filter portion 301, may be removed from the valve assembly 300 exterior to the container 68. The filter portion 230, therefore, need not be accessed from within the container 68. Also, the floor 66 may be formed, as discussed above, to ensure a substantially (e.g. about 95% to about 99.9% empty) or entirely empty container 68 prior to accessing or removing the spigot assembly.

Figure 15:
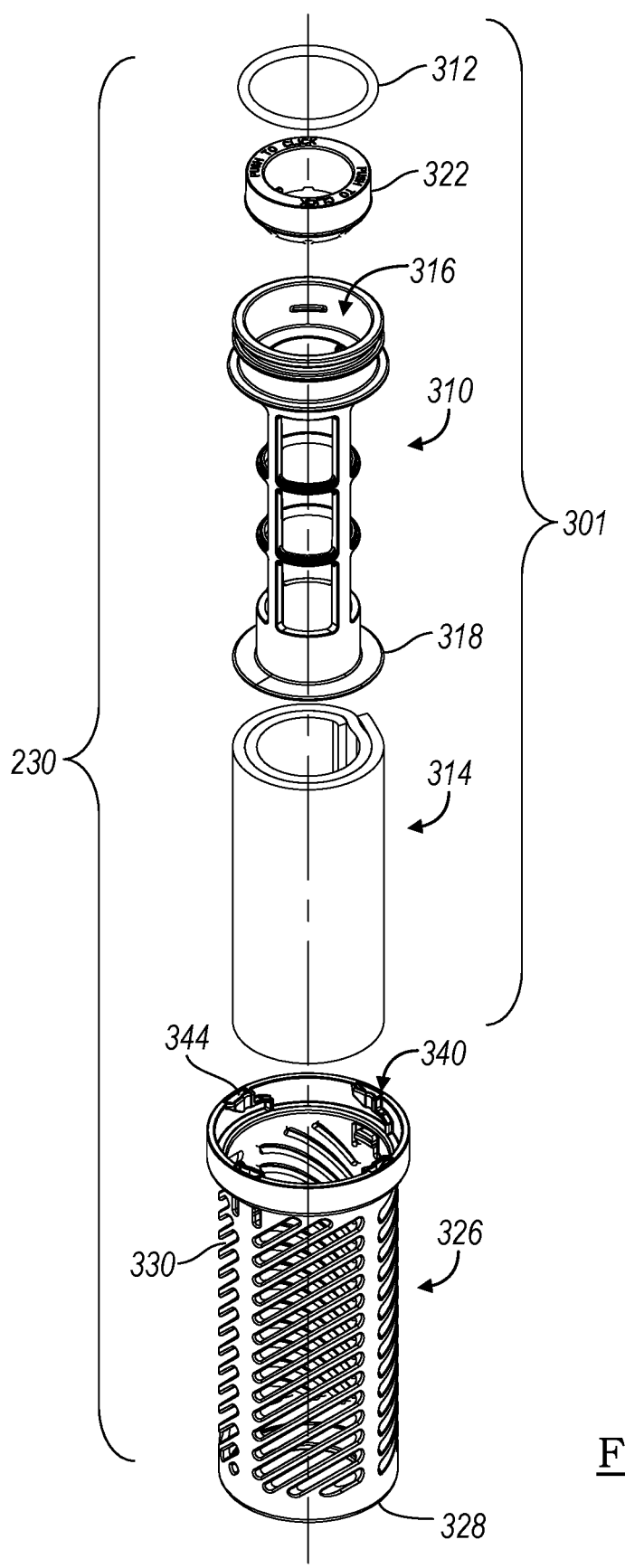
FIG. 15 is an exploded view of a filter assembly, according to various embodiments.
Figure 16:
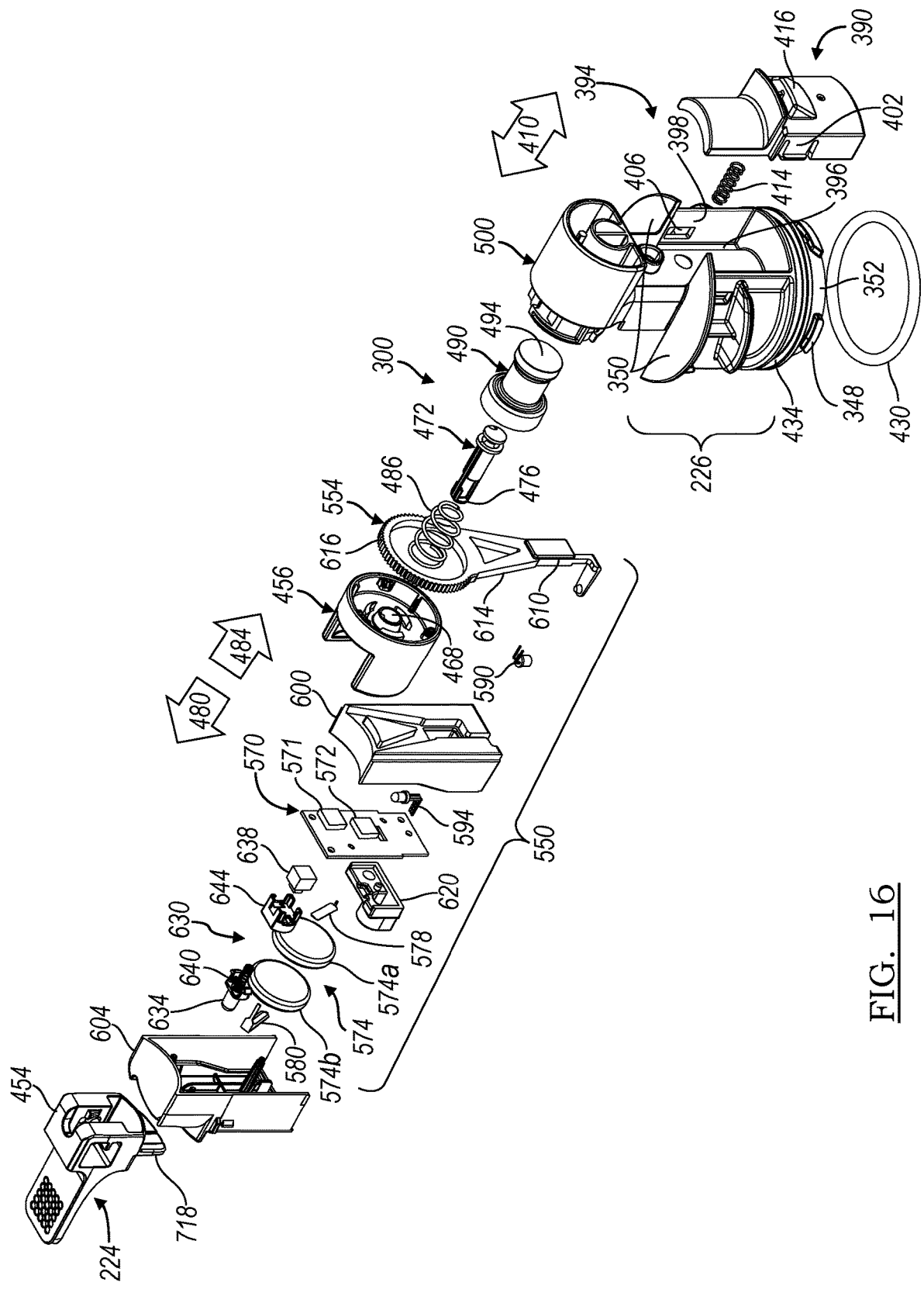
FIG. 16 is an exploded view of a valve assembly, according to various embodiments.

With continuing reference to FIG. 14, and additional reference to FIG. 15, the valve assembly 300 is illustrated in greater detail. As discussed above, the valve assembly 300 may operate to start and stop flow of a fluid from the container. The valve assembly 300 may further be connected to the filter assembly 230. It is understood, however, that the filter assembly 230 need not be connected to the valve assembly 300 for the valve assembly 300 to operated.

The handle 224, of the valve assembly 330, may include an engagement portion or holding portion 450 that may be held or moved or engaged by a user, such as a digit or multiple digits thereof. The handle member 224 may further include a body portion 454 that may be engaged or held relative to a cap or plunger cap portion or member 456. The handle 224 may further include a cover or flange extending at an angle relative to the engagement portion 450.

The plunger cap 456 may include selected members or fingers, such as a first projection 458 and a second projection 460. The two projections 458, 460 may include internal walls or side portions that engage the body member 454, such as at an axle or swivel portion 464. The axle 464 may be engaged within or engaged to the side walls 458, 460 to allow for movement or rotation of the handle assembly 224.

In various embodiments, the handle 224 may move to unseal the valve assembly 300. To unseal, the handle member 224 may be rotated or moved forward, such as generally in the direction of arrow 468. The handle member 224, therefore, may rotate relative to the plunger cap 456. The valve assembly 300 may be resealed by moving the handle member 224 in an opposite direction of arrow 468.

The plunger cap 456 may define or have a through bore or passage 468 that allows a plunger 472 to pass there through. The plunger 472 may include a handle engaging portion 476 that may engage a portion of the body 454 of the handle 224. The handle body 454 may include a selected geometry or design such that rotating it in the direction of arrow 468 causes an internal portion or portion of the body 454 to generally move in the direction of arrow 480, such as away from the outlet 220. The plunger member 472, therefore, being engaged or fixed to the body 454, may also move in the direction of arrow 480 when the handle 224 is moved in the direction of arrow 468. The plunger member 472, however, may be generally biased in the direction of arrow 484 with a selected biasing member, such as a spring bias member 486. The spring bias member 486 may bias the plunger 472 generally in the direction of arrow 484.

The plunger 472 may be engaged or fixed to a plunger seal 490. The plunger seal 490 may be engaged to the plunger 472 in any appropriate manner, such as having an internal bore that is fixed to, such as with an interference fixture, adhesive, or the like. The plunger seal 490 may also include a valve or sealing portion 494 that may engage a valve seat formed within an outlet body 500 of the valve assembly 300.

The plunger body 500, therefore, may have a selected valve seat 506 formed therein. The plunger seal 490 may be moved away from the valve seat 506 by the plunger 472. Opening the valve seal may open a passage through the valve assembly 300, such as through an outlet passage or bore 510. The passage 510 may be formed through the valve assembly 300 and into the container 68. The passage 510, however, may be covered by the filter assembly 230, as discussed above. Accordingly, upon opening the valve assembly 300, such as by moving the plunger seal 490 away from the valve seat 560 a fluid may flow through the filter assembly 230, such as generally in the direction of arrows 514 and 516 through the passage 510 and out the outlet 220, generally in the direction of arrow 520.

Thus, movement of the handle 224 may allow the plunger seal 490 to move away from the valve seat 506 and allow fluid to flow from the container volume 620 out the outlet 220. Generally, a volume of the fluid within the container volume 620 would be above the outlet passage 510 to move past the valve assembly 300 and out of the container 689. The valve assembly 300, therefore, may be operated to withdraw or allow exit of fluid from the container 68.

Allowing fluid to exit the container 68 through the valve assembly 300, however, may be regulated and/or monitored by a selecting monitoring or control assembly 550. The monitoring assembly 550 may include various components, such as those discussed further herein. In particular, for example, the fluid monitoring assembly 550 may monitor a flow of fluid out of the container 68. Additionally, the fluid monitoring assembly 550 may include an indicator, such as a user indicator 554 to indicate various information to the user, such as a useful life of the filter assembly 230, volume of fluid within the container 68, volume of fluid dispensed through the valve assembly 300, or other appropriate indications.

The monitoring assembly 550 may include various components such as a circuit board 570 that may be formed as a printed circuit board (PCB) in an appropriate manner. The PCB 570 may include various components such as a processor member 571, traces and/or vias to interconnect various components, capacitors, resistors, or the like. The PCB 570, therefore, may include a control system that executes instructions and may be saved on a memory system 572 incorporated therewith, for various purposes. Connected to the PCB 570 may be a power source 574 which may include one or more battery cells 574a and 574b that are connected to and/or transfer power to the various portions of the monitoring assembly 550, such as components on the PCB 570, via one or more terminals, such as a first terminal 578 and a second terminal 580. The power cell 574 may power the monitoring assembly 550 for a selected period of time such as a period of days, months, or a plurality of years.

The monitoring assembly 550 may further include various components such as a sensor member 590 that may sense environmental light impinging thereon such as during removal of the spigot assembly 50 from the container 68, removal of the filter assembly 230 from the valve assembly 300, and/or movement of the handle 224, as discussed further herein. The sensor 590 may transmit a signal to a controller or other portion of the PCB 570, to provide a count and/or timing signal thereto, as discussed further herein.

Figure 12A:
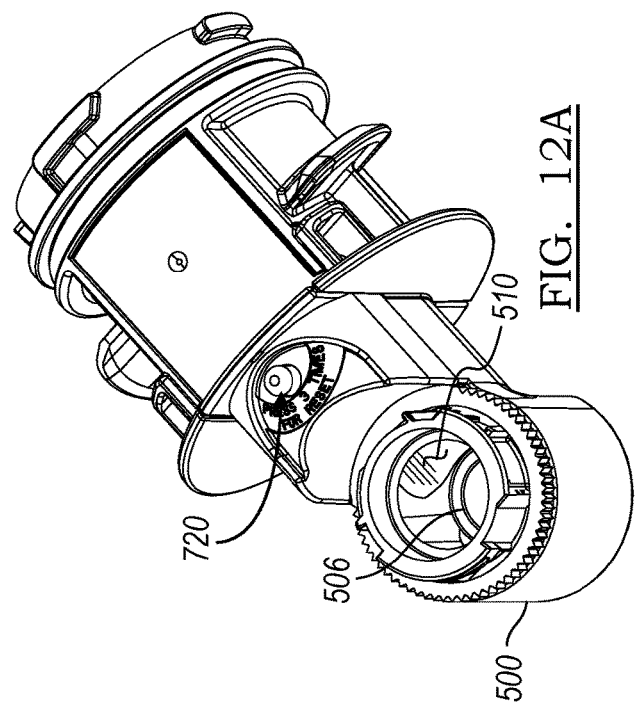
FIG. 12A is a perspective view of a valve assembly, according to various embodiments.
Figure 12:
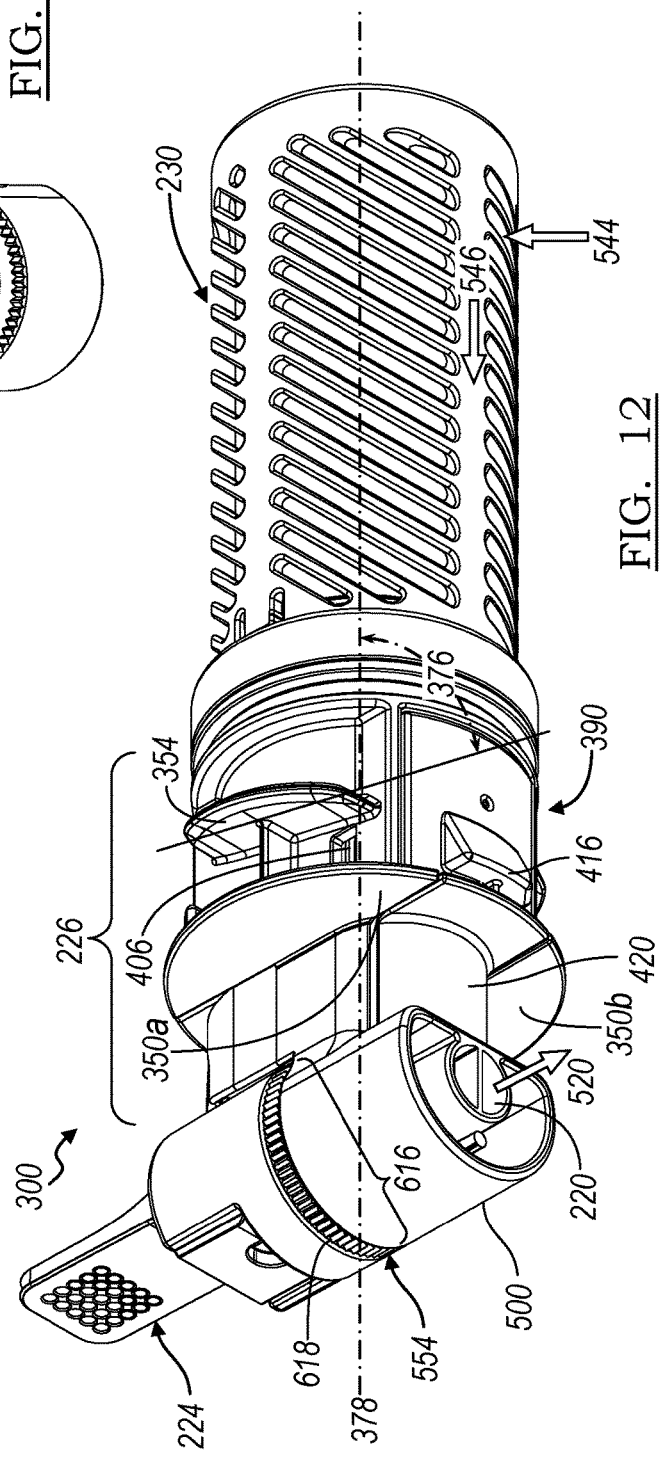
FIG. 12 is a perspective view of a valve and filter assembly, according to various embodiments.

A light source or emitter, such as a light emitting diode (LED) 594 may also be provided. The LED 594 may interconnected with the PCB 570 to emit light at a selected time. The LED 594 may emit light, as discussed further herein. In various embodiments, the PCB 570 may be held or encapsulated in a selected member such as in a bottom housing 600 and a top housing 604. The bottom housing 600 may also hold or encapsulate at least a portion of the indicator 554. The indicator 554 may also be referred to as a light pipe. As illustrated in FIG. 13 and FIG. 12, the indicator 554 may be viewable relative to the spigot body 500. Further, as illustrated in FIG. 1, the indicator 554 may be viewable by a user when the container assembly 30 is assembled. Accordingly, the LED 594 may emit a light and the indicator or light pipe 554 may transmit the light exterior to the container 68 for viewing by the user.

The light pipe 554 further includes a light receiving portion 610 that may immediately receive light emitted by the LED 594. The light pipe 554 further includes the light transmission portion 614 that may transmit the light to a selected region. The light pipe 554 further includes an indication or viewing region or portion 616 that may be viewed by the user when the container assembly 30 is fully assembled. Accordingly, the user may view light emitted by the LED 594 at the indication region 616 without disassembling or removing the spigot assembly 50 from the container 68. Moreover, the indication or viewable region 616 may include a selected geometry or shape, such as a plurality of ridges or a lenticular portion 618. The lenticular portion 618 may allow for a selected dispersion and/or viewing angle of light emitted by the LED 594 at a selected time.

As discussed above, the PCB 570 may include the controller 571 that is able to execute selected instructions. The instructions may include operating the LED 594 at an appropriate time and/or manner. As discussed further herein, therefore, the user may view the operation of the LED 594, which may be based upon executing instructions by the processor, via the indicator 554 such as through the ventricular portions 618.

In various embodiments, the PCB 570 may include various or have protective portions connected thereto, such as a protective portion or cover 620. The cover 620 may limit transmission of light away from the indicator 554 and/or to the sensor 590. The cover 620 may also include or provide a water tight seal over selected components of the PCB 570. The cover 620 may also limit light entering or contacting portions relative to the PCB 570, as discussed herein.

Finally, in various embodiments, the control system 550 may be used to provide an indication of selected functions and/or statuses of components of the container assembly 30, such as filter capacity of the filter assembly 230. Therefore, replacement of the filter assembly 230 may provide or require a reset of a count and/or timing count for use of the filter assembly 230. In various embodiments, the sensor 590 may sense light (e.g. ambient light) when the filter assembly 230 is removed from the valve assembly 300. The signal from the sensor 590 may be used to reset the counter of the system 550. The counter or flow count, therefore, may be substantially automatically reset. This may be used to determine or indicate a life span or filtering use of the filter media. It is understood, however, that a user may also provide a manual or physical indication or signal, such as selectively pressing and holding a resent bottom 630. The button 630, therefore, may be provided to reset the timer and/or other mechanisms of the control system 550.

The button 630 assembly may include a mechanical push button 634 that may project through a portion of the case 604 to be depressed or accessed by a user. The button 634 may be pressed by a user to depress a switch 638 that is connected to the PCB 570. The switch 638 may send a signal to selected components of the PCB 570, such as the controller thereon, to reset a timer, start a timer, or other appropriate signals. The switch 638 may be mounted to the PCB, but spaced apart from a portion of the housing 604. Accordingly, a button 634 may be biased in a selected direction, such as away from the switch 638 with a selected biasing portion, such as a biasing spring or biasing movable hinge 640. Further, the switch 638 may be housed and/or contained with a stand 644 which may also protect the switch 638 from pressure applied by the button 634. Nevertheless, the user may access the switch 638, such as though the button 634, for various purposes as discussed herein.

The button assembly 630 may also be selectively contacted by the handle 224. As noted above, the handle 224 may include the flange 718. The flange 718 may engage the button 634 when closed. The button 634 and, therefore, the switch 638 may generate a signal, when the handle 224 is moved to the opened position. Thus, the signal may be used to determine when the valve is opened and a time may be used to calculate a flow or volume of fluid passing through the filter assembly 300. Accordingly, the switch assembly 630 may be used for resetting and/or flow determinations.

As noted above, the spigot assembly 50 may include the valve assembly 300 and the filter assembly 230. The spigot assembly 50 may be efficiently removed and/or installed into the container 68. Further, the filter assembly 230 may be replaced, or at least portions thereof, such as the filter media and/or core 310, at selected times. The spigot assembly 50 may be removed from the container 68 by depressing the member 390 and twisting the spigot assembly 50 in a selected manner to unlock and disengage the spigot assembly 50 from the container 68. In a reverse manner, the spigot assembly may be inserted into the container 68 and rotated to engage the engagement walls, such as the outer walls 350 and/or the engagement wall 354 with the container 68 to connect the spigot assembly 50 to the container 68. Moreover, the control assembly 550 may be used to provide information to the selected user based upon use of the container assembly 30, such as amount of filtered fluid (e.g. water) and/or other appropriate portions.

Figure 18:
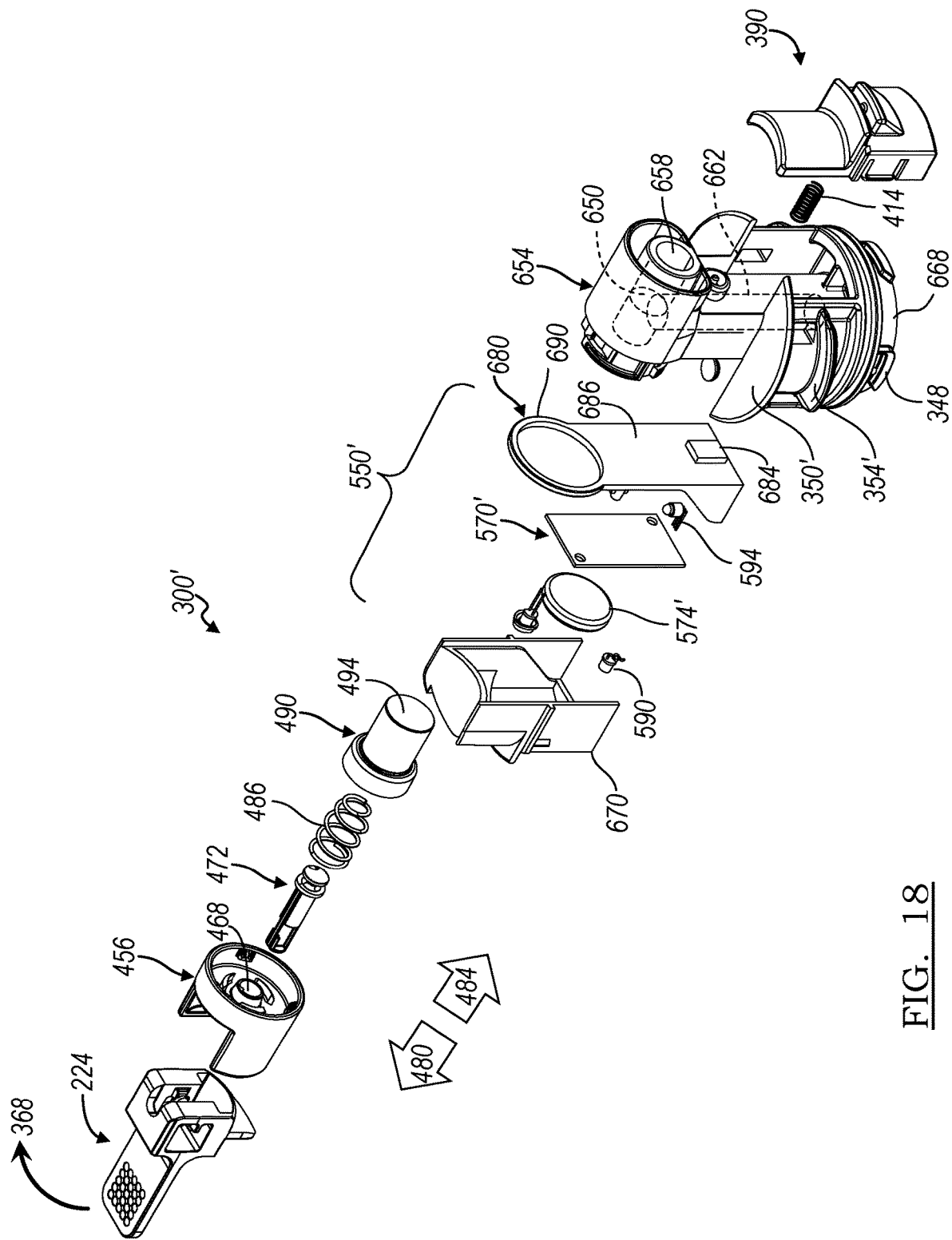
FIG. 18 is an exploded valve assembly, according to various embodiments.

The spigot assembly 50 may be provided in various embodiments. Accordingly, a spigot assembly 50' is illustrated in FIG. 18. The spigot assembly 50 may include various portions that are similar and/or equal to spigot portions as discussed above. Accordingly, the valve assembly 300' will be described in a manner similar to that described above with the differences indicated therein.

The valve assembly 300' may include the handle 224 as described above. The handle 224 may engage and/or be positioned within the plunger cap 456. Further the plunger 472 may pass through the bore 468 of the plunger cap 456 and engage a portion of the handle 224. Thus, the plunger 472 may move due to movement of the handle 224, such as in rotation of the handle generally in the direction of the arrow 368. The plunger 472 may therefore, move generally in the direction of arrow 480 when the handle 224 is moved in a selected direction, such as in the direction of arrow 368.

The plunger 472 may be engaged within and/or connect to the sealing plunger or plunger seal 490 that includes a seal portion or member 494. Further, a biasing member or spring 486 may bias the plunger 472 and/or the plunger seal 490 generally in a direction to seal the valve assembly 300', such as generally in the direction of the arrow 484. The plunger seal 490 may sit against a seat 650 within a valve or spigot body 654, as similar to the valve seat 506 as discussed above. Further, the valve spigot 654 may have an outlet 658 that communicates with a passage through the spigot body 654. Thus, movement of the handle 224 may seal or unseal the valve, such as the plunger seal 490 from the valve seat 650 within the spigot body 654 to allow passage of a fluid through the outlet 658, similar to a passage of a fluid through the outlet 220.

The valve assembly 300' may further include the exterior walls 350' and the engagement walls or portions 354', similar to the walls 350 and 354 discussed above. Accordingly, the spigot body 650 may be fixed to the container 68 in a manner similar to that discussed above. In various embodiments, however, a filter engaging wall portion 668 having the filter engaging fingers or portions 348 thereon, may be shorter in dimension than the wall 352, discussed above. The filter assembly 230, however, may still engage with the spigot body 654 in an appropriate manner, such as that discussed above.

The spigot assembly 300' may further include a catch member 390 and the biasing spring 414, as discussed above. The catch member 390 and the biasing spring 414 may be substantially similar to that as discussed above. However, the dimensions of the spigot body 654 and the catch member 390 may be augmented depending upon the relative sizes thereof.

The valve assembly 300' may further include a monitoring system 550'. The monitoring system 550' may be housed between a first or upper housing 670 and the spigot body 654. Thus, the control assembly 550 may not be housed between two housing members, but may be held directly against the spigot assembly or spigot body 654. Nevertheless, the monitoring assembly 550' may include a PCB 570' that may include various components, such as a control and/or memory. Further, the control assembly 570' may include a power cell portion 574' which may include one or more battery or coin cells. The coin cells may be connected to the PCB 570' in an appropriate manner to provide power thereto. The control mechanism 550' may include a sensor 590 to communicate or receive an indication of light, such as with movement of the handle 224.

The control assembly 550 may further include the LED 594 that may emit a light or light signal based upon controls from a sensor or controller of the PCB 570. The LED 594 may be received in an indicator portion or member 680 that may include a LED receiving portion 684 and LED transmission portion 686 and a viewable or indicator portion 690. The indicator portion 690 may be smooth and/or include lenticular portions, as discussed above. Further, the light transmission portion 686 may be substantially larger and may be a full width of a volume within the spigot body 654. Accordingly, the LED 594 may emit a light that is transmitted to the viewable portion 690. The viewable portion 690 may be similar in position to the viewable portion 616, as discussed above, to be viewed by the user in the container assembly 30. The container assembly 30, therefore, may include a selected spigot assembly, including the spigot assembly 50 or a spigot assembly including the valve assembly 300'. It is understood that the light pipe or indicator portions 680 and/or 550 may be provided in any appropriate dimension or size to transmit light from a selected light source, such as the LED 594, for viewing by the user.

Figure 19:
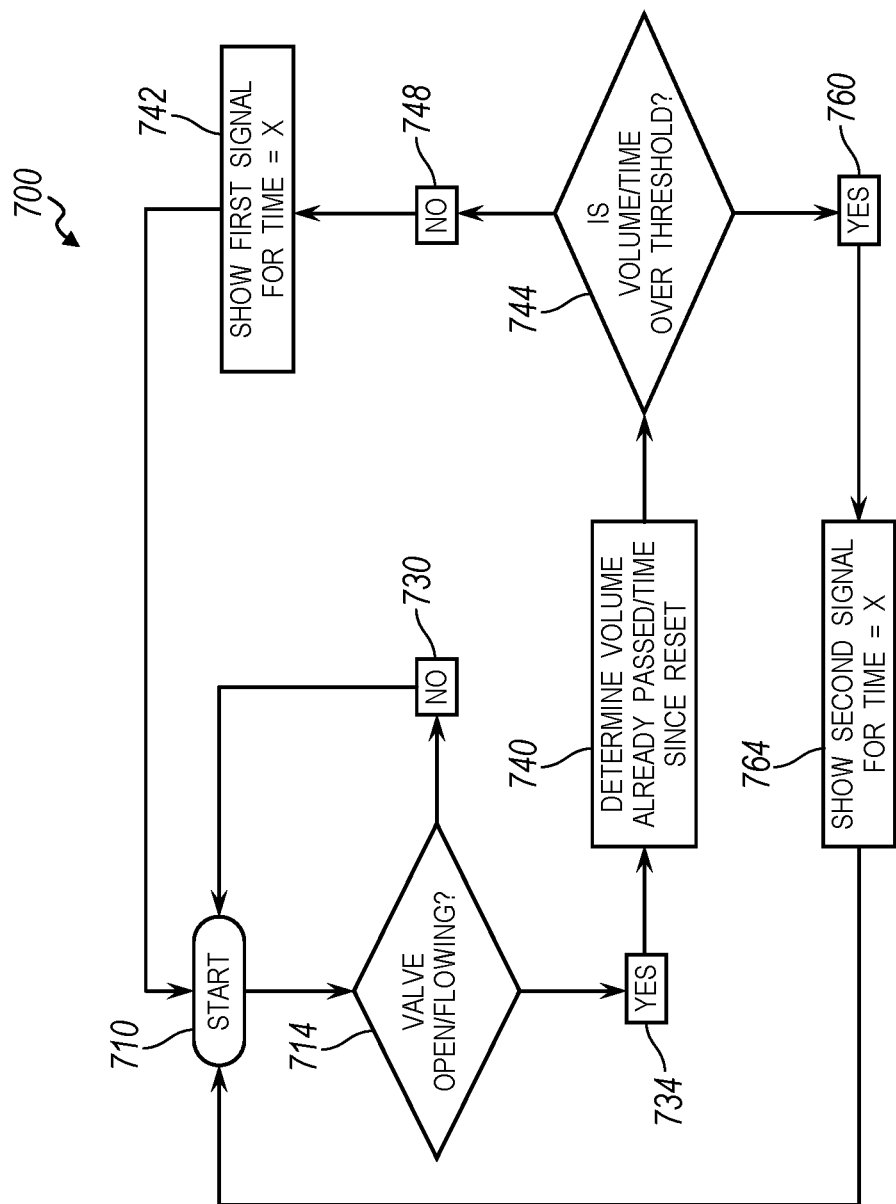
FIG. 19 is a flowchart of an indication method, according to various embodiments.

The spigot assembly 50, as noted above, includes the indicator 554, or selected indicator according to various embodiments. The indicator 554 may include a user visible portion, such as the user visible portion 616. The user visible portion 616 may be used to provide an indication to the user regarding selected features and/or indications, such as a lifetime of the filter assembly 320, or other appropriate feature. In various embodiments, as noted above, the control system 550 may include a selected processor that is able to execute instructions to provide an indication to the user. With reference to FIGS. 1-18 and additional reference to FIG. 19, a process 700 for providing an indication to a user is illustrated. The indication process 700 is illustrated as a process or algorithm that may be carried out as instructions executed by a processor. The monitoring system 550 may include selected information that may be accessed and executed by the processor 571. The memory 572 may be incorporated into the processor 571 and/or separate therefrom.

Figure 17:
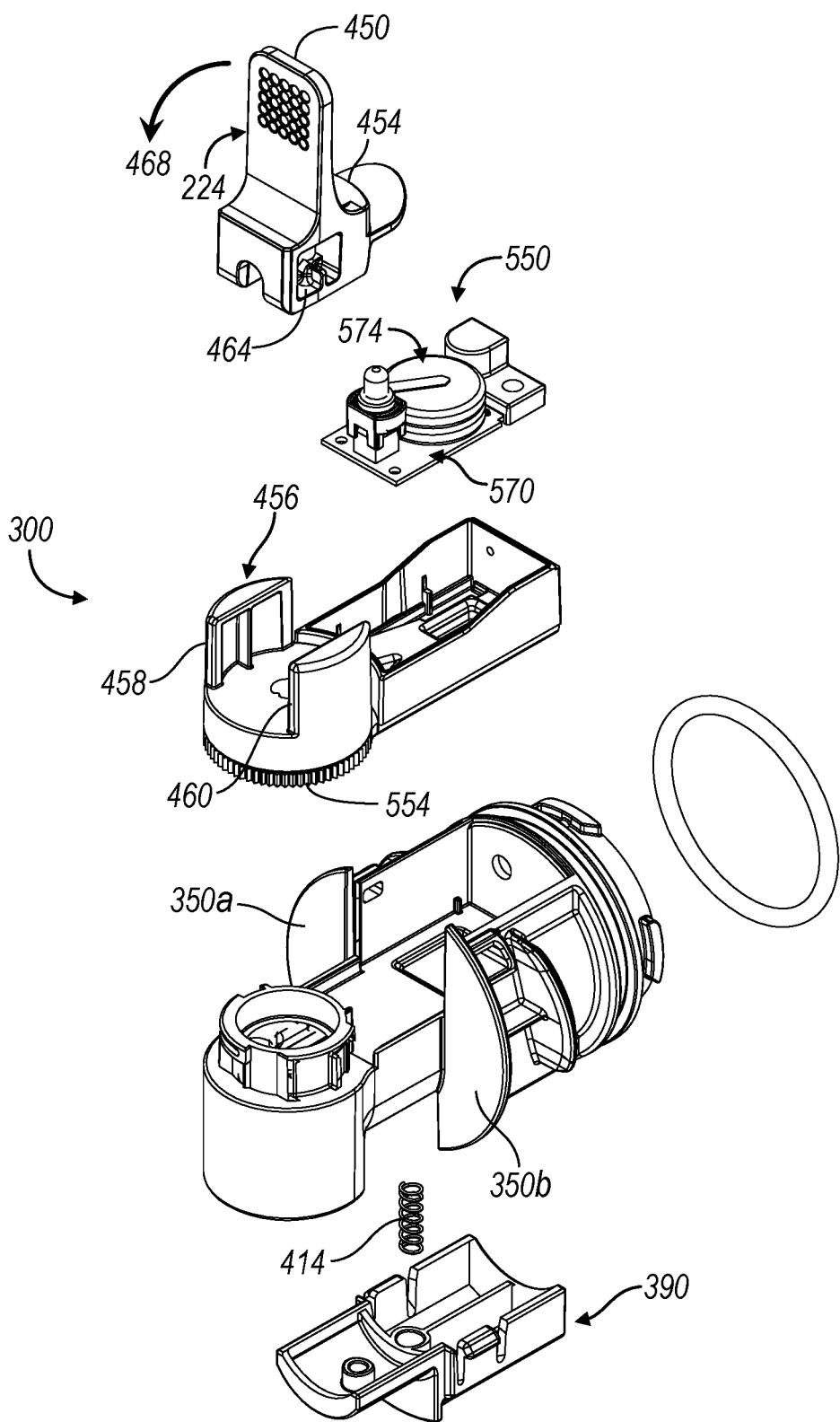
FIG. 17 is a detailed partially exploded view of the valve assembly, of FIG. 16.

Regardless, the process 700 may be executed for an indication to the user. For example, the process 700 may begin at start block 710 and move to determination of whether a valve is open or fluid is flowing in block 714. The determination of whether the valve is open in block 714 may be based upon selected inputs or signals. For example, as noted above, the monitoring system 550 may include one or more sensors, such as the sensor 590 that may sense ambient light. The handle 224 may include the flap or paddle portion 718 that may be covering an opening or portal 720 and a portion of the spigot assembly or valve assembly 300. When the handle 224 moves in the direction of arrow 468, as illustrated in FIG. 17, the flap 718 may move and allow ambient light to enter the opening 720, or other appropriate opening. Alternatively and/or in addition therefore, the flap 718 may also engage the button assembly 630 to generate a signal that flow is occurring. Thus, various sensors may be used to determine flow or an open state of the valve assembly 300.

The signal sent by a sensor after sensing light may be an indication that the valve is open. Additionally, other sensors may be provided such as a paddle wheel, inductive flow, flow switch, or the like may be positioned relative to the valve assembly 300, such as within the passage 510 or other portion of the valve assembly 300 to determine whether water or other fluid is flowing. Alternative or additional sensors or switches may be positioned relative to the plunger seat 456 to determine movement of the handle 224 to determine whether the valve is open or fluid is flowing.

If a determination is that the valve is not open or no fluid is flowing a NO-path 730 may be followed to restart the process at start block 710. However, if a determination is made that the valve is open or fluid is flowing a YES-path 734 may be followed.

After determining that the valve is open and following the YES-path 734, a determination of a volume already passed or delivered and/or time since a reset may be made in block 740. A determination of a volume passed may be based upon a direct measurement of a flow meter, such as a water wheel, as discussed above. Additionally, the monitoring system 550 may include a timer that has timed an amount of time that the valve has or is open and an estimation of a volume of fluid has passed may be made. Thus, a determination based upon a time since a first opening or since a reset may be used to determine total volume passed.

As noted above, the monitoring system 550 may include a hard reset system, including the switch 638 that may be used to reset a timer. Additionally, the filter assembly 230 may engage and/or operatively depress or activate a reset upon removal and placement of at least a portion of the filter assembly, such as the cage 326. Also, as discussed above, the sensor 590 may be used to sense ambient light when the filter assembly is removed, and thus assumed to be replaced. Accordingly, the control system 550 may include a timer that may be reset. Thus, a determination may be made to determine a volume passed and/or time passed since a reset in block 740.

After determining an amount or volume of time that has passed in block 740, a determination of whether a volume of time is at or over a threshold, may be made, in block 744. A threshold may be any appropriate threshold such as a volume and/or time. The threshold may be saved in the memory system 572 and may be recalled by the processor system 571 to make a determination of whether a threshold has been met. Accordingly, a determination of whether a volume or time threshold has been met is made in block 744.

If the threshold has not been met a NO-path 748 may be followed to show a first indication signal for a first time or a time equal to a selected amount X in block 752. For example, if the NO-path 748 is followed, a first indication may be powering of a green light or powering the LED 594 to be green for a selected period of time. The period of time may be any appropriate period of time such as about 1 second, 2 seconds, 3 seconds, or any appropriate time. Regardless, a first indication or signal may be made when the NO-path 748 is followed. Accordingly, the user may view the indicator 554 and view a selected color, such as green, and understand that a threshold has not been met as determined by the control system 550.

If a determination is that a volume or time threshold has been met in block 744, a YES-path 760 may be followed. If the YES-path 760 is followed a showing or forming of a second signal for a time in block 764 may be made. The time for showing the second signal may be any appropriate time, and may be similar or identical to the time for showing the first signal. The second signal, however, may differ from the first signal, such as different color, intensity, or other feature. For example, the second signal may be a second color such as a color red. The LED 594 may, therefore, be powered to show red and the user may view it at the indicator 554.

It is understood that any appropriate number of thresholds may be determined and that a second threshold may provide for an indication of a third signal, such as a rapid blinking red color or other signal to indicate a different condition and/or stage of condition of a portion of the container assembly 30, such as the lifespan of the filter assembly 230.

After the showing of the signal for a selected time with the indicator 554, return paths from both the signal blocks 752, 764 may be made to the start block 710. Accordingly, the control system 550 may cycle through the process 700 at a selected period and/or when the valve is open in block 714 and be understood to be a loop or repeated process. Accordingly, opening the valve in block 714 may operate a switch to indicate that the process 700 should initiate such that the system is in a sleep mode until the valve is determined to be open in block 714.

Regardless, the monitoring system 550 may operate to provide an indication to a user of various status features of the container assembly 30. For example, the monitoring system 550 may be used to provide an indicator to the user of the lifespan of the filter assembly. Additionally, indications may be made regarding a flow rate, battery life, or other information to the user with the indicator 554 based upon the control system 550.

The container assembly 30, therefore, may include the monitoring system 550. The monitoring system 550 may automatically monitor selected features, such as a filter amount of time of the filter assembly 230. The monitoring system 550 may automatically monitor and provide indications, as noted above, by generating and receiving selected signals (e.g. from the button assembly 630 and/or sensor 590) and evaluating the same with the processor system 571. The monitoring system 550, therefore, may execute instructions and receive signals from sensors or switches, as generally understood by one skilled in the art.

The container 68 may also be filled through the lid 58 and/or the access panel 64. The filling of the container 68 may be done with direct access to the floor 66. The fluid entering the container 68 through the lid or access panel 64 need not encounter a filter prior to filling or being placed in the container volume 62. The filter assembly 230 may operate to filter water, on demand, as the fluid exits the container 68.

Instructions may be executed by a processor and may include may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Pen, Javascript®, HTML5, Ada, ASP (active server pages), Pen, Scala, Erlang, Ruby, Flash®, Visual Basic®, Lua, or Python®.

A processor or module or 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system to contain a fluid, comprising:
    a container having:
        a first sidewall and a second sidewall extending from a first end to a second end,
        a first end wall and a second end wall, and
        a bottom wall extending between all of the first sidewall, the second sidewall, the first end wall, and the second end wall;
    a valve assembly operable between an open configuration and a closed configuration to selectively remove a fluid from the container;
    a filter assembly selectively connectable to the valve assembly and operable to filter the fluid disposed in the container as the fluid exits the container via the valve assembly when the valve assembly is disposed in the open configuration; and
    a monitoring system to indicate a feature of the container or the filter assembly, wherein the monitoring system is integrated into the valve assembly so that the valve assembly and the monitoring system are removable from the container as a single unit.

2. The system of claim 1, wherein:
    the valve assembly is selectively connectable to the first end wall and extends at least partially within a sump; and
    the bottom wall includes a first region that is angled toward a second region of the bottom wall, and the second region forms the sump.

3. The system of claim 2, wherein the bottom wall forms an angle greater than zero degrees relative to a level surface and the angle greater than zero directs the fluid to at least the second region.

4. The system of claim 1, wherein the first sidewall and the second sidewall form a taper for the container, the taper extending from a top portion of the container toward the bottom wall.

5. The system of claim 1, wherein at least the second end wall extends from a lower portion to an upper portion and an outer surface of the upper portion forms a radius that is operable as a grasping portion of the container.

6. The system of claim 1, wherein:
    the first end wall forms an internal engaging portion;
    the valve assembly includes a container engaging portion; and
    the internal engaging portion and the container engaging portion include radially extending complementary engaging walls.

7. The system of claim 6, wherein the radially extending complementary engaging walls fix the valve assembly to the first end wall with a quarter turn.

8. The system of claim 1, wherein the monitoring system includes a visual indicator.

9. The system of claim 8, wherein the visual indicator includes a light pipe to direct a light emitted from a light source.

10. The system of claim 1, wherein the filter assembly is selectively removable from the container as part of the single unit.

11. The system of claim 10, wherein the monitoring system includes a light sensor to sense existence of light when the filter assembly is selectively removed from the valve assembly.

12. The system of claim 10, wherein the single unit is slidably removable from the container.

13. The system of claim 1, wherein the container includes a fill port and the container defines a container volume that is filled unobstructed through the fill port when the valve assembly and the filter assembly are installed in the container.

14. The system of claim 1, wherein the monitoring system is operable to:
    generate a reset signal based on sensing of an ambient light when the filter assembly removed from the valve assembly.

15. The system of claim 14, wherein the monitoring system is operable to:
    determine a status of whether a threshold is reached is based at least upon one or more signals received when the valve assembly is moved from the closed configuration to the open configuration, the reset signal, or any combination thereof.

16. A system to contain a fluid, comprising:
    a container having:
        a first sidewall and a second sidewall extending from a first end to a second end,
        a first end wall and a second end wall, and
        a bottom wall extending between all of the first sidewall, the second sidewall, the first end wall, and the second end wall;
    a valve assembly operable between an open configuration and a closed configuration to selectively remove a fluid from the container;
    a filter assembly selectively connectable to the valve assembly to filter the fluid exiting the container; and
    a monitoring system to indicate a feature of the container or the filter assembly, wherein the monitoring system includes a light sensor to sense existence of an ambient light when the filter assembly is selectively removed from the valve assembly and the monitoring system is operable to generate a reset signal based on sensing of the ambient light.

17. The system of claim 16, wherein the monitoring system includes a visual indicator.

18. The system of claim 17, wherein the visual indicator includes a light pipe to direct a light emitted from a light source.

19. The system of claim 16, wherein:
the monitoring system is integrated into the valve assembly; and
the valve assembly and the monitoring system are removable from the container as a single unit.

20. The system of claim 16, wherein the valve assembly and the filter assembly are selectively removable from the container as a single unit.

21. The system of claim 20, wherein the single unit of the valve assembly and the filter assembly are slidably removable from the container.

22. The system of claim 16, wherein the container includes a fill port and the container defines a container volume that is filled unobstructed through the fill port when the valve assembly and the filter assembly are installed in the container.

23. The system of claim 16, wherein the monitoring system is further operable to:
determine a status of whether a threshold is reached is based at least upon one or more signals received when the valve assembly is moved from the closed configuration to the open configuration, the reset signal, or any combination thereof.

24. The system of claim 16, wherein:
the bottom wall of the container includes a first region that is angled toward a second region of the bottom wall, and the second region forms a sump; and
the valve assembly is selectively connectable to the first end wall and extends at least partially within the sump when connected to the first end wall.

25. The system of claim 24, wherein the bottom wall forms an angle greater than zero degrees relative to a level surface and the angle greater than zero directs the fluid to at least the second region.

26. The system of claim 16, wherein the first sidewall and the second sidewall form a taper for the container, the taper extending from a top portion of the container toward the bottom wall.

27. The system of claim 16, wherein at least the second end wall extends from a lower portion to an upper portion and an outer surface of the upper portion forms a radius that is operable as a grasping portion of the container.

28. The system of claim 16, wherein:
the first end wall forms an internal engaging portion;
the valve assembly includes a container engaging portion; and
the internal engaging portion and the container engaging portion include radially extending complementary engaging walls.

29. The system of claim 28, wherein the radially extending complementary engaging walls fix the valve assembly to the first end wall with a quarter turn.

* * * * *